(12) United States Patent
Tsai

(10) Patent No.: US 12,107,503 B2
(45) Date of Patent: Oct. 1, 2024

(54) MULTI-STAGE BUCK CONVERTER

(71) Applicant: INDUSTRIAL TECHNOLOGY RESEARCH INSTITUTE, Hsinchu (TW)

(72) Inventor: Wen-Tien Tsai, Liuqiu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 198 days.

(21) Appl. No.: 17/565,228

(22) Filed: Dec. 29, 2021

(65) Prior Publication Data

US 2023/0170804 A1 Jun. 1, 2023

(30) Foreign Application Priority Data

Dec. 1, 2021 (TW) ................. 110144821

(51) Int. Cl.
*H02M 3/158* (2006.01)
*H02M 1/00* (2007.01)
(Continued)

(52) U.S. Cl.
CPC ........... *H02M 3/1584* (2013.01); *H02M 3/07* (2013.01); *H02M 1/0083* (2021.05); *H02M 1/0095* (2021.05); *H02M 1/15* (2013.01)

(58) Field of Classification Search
CPC ............. H02M 1/0083; H02M 1/0095; H02M 1/14–15; H02M 3/07–078; H02M 3/158; H02M 3/1584–1586
See application file for complete search history.

(56) References Cited

U.S. PATENT DOCUMENTS 10,811,962 B2 10/2020 Chuang et al.
2012/0307526 A1* 12/2012 Senanayake ........ H02M 3/1584
363/16
(Continued)

FOREIGN PATENT DOCUMENTS

EP 3806303 A1 * 4/2014
JP 2005-27488 A 1/2005
(Continued)

OTHER PUBLICATIONS

Machine translation of JP-2005027488-A. (Year: 2005).*
(Continued)

*Primary Examiner* — Fred E Finch, III
(74) *Attorney, Agent, or Firm* — Birch, Stewart, Kolasch & Birch, LLP

(57) ABSTRACT

A multi-stage buck converter is provided. The multi-stage buck converter includes a capacitor string, a power switch module and a power conversion module. The capacitor string includes N capacitors connected in series. The power switch module is coupled to the capacitor string and includes N power switch groups. The power conversion module is coupled to the power switch module and includes an energy storage element. Wherein a working frequency of the power conversion module is equal to N times of the switching frequency of each of the N power switch groups, and N is a positive integer greater than or equal to 2. Wherein the working frequency is the number of times of the energy storage element that completes charging and discharging in a unit time.

11 Claims, 27 Drawing Sheets

(51) Int. Cl.
  *H02M 1/15*   (2006.01)
  *H02M 3/07*   (2006.01)

(56) References Cited

U.S. PATENT DOCUMENTS

| | | | | |
|---|---|---|---|---|
| 2016/0344214 | A1* | 11/2016 | Petersen | H02M 3/07 |
| 2017/0005576 | A1* | 1/2017 | Petersen | H02M 1/14 |
| 2020/0161959 | A1 | 5/2020 | Chuang et al. | |
| 2022/0069716 | A1* | 3/2022 | Morimoto | H02M 1/15 |

FOREIGN PATENT DOCUMENTS

| | | | |
|---|---|---|---|
| JP | 2005027488 A | * | 1/2005 |
| TW | 200924365 A | | 6/2009 |
| TW | I466423 B | | 12/2014 |
| TW | I560987 B | | 12/2016 |
| TW | 201916554 A | | 4/2019 |
| TW | 202121818 A | | 6/2021 |
| WO | WO 2020/175078 A1 | | 9/2020 |

OTHER PUBLICATIONS

Taiwanese Office Action and Search Report for Taiwanese Application No. 110144821, dated Sep. 6, 2022.
Carmen Parisi, "Multiphase Buck Design From Start to Finish (Part 1)", Texas Instruments Incorporated, 2021, pp. 1-18 (19 total pages).
Japanese Office Action for Japanese Application No. 2022-055927, dated Mar. 14, 2023, with English translation.

* cited by examiner

MULTI-STAGE BUCK CONVERTER

This application claims the benefit of Taiwan application Serial No. 110144821, filed Dec. 1, 2021, the subject matter of which is incorporated herein by reference.

TECHNICAL FIELD

The disclosure relates in general to a multi-stage buck converter.

BACKGROUND

In the conventional buck converter, although the high power density could be increased by increasing the switching frequency of the power switch, it results in increasing switching loss and heat generation (limited power supply capacity), and high-frequency signal is also easy to resonate with parasitic characteristics (inductance or capacitance), causing component burnout and system instability. Therefore, proposing a new buck converter to improve the aforementioned conventional problems is one of the goals of the industry in this technical field.

SUMMARY

According to an embodiment, a multi-stage buck converter is provided. The multi-stage buck converter includes a capacitor string, a power switch module and a power conversion module. The capacitor string includes N capacitors connected in series. The power switch module is coupled to the capacitor string and includes N power switch groups. The power conversion module is coupled to the power switch module and includes an energy storage element. Wherein a working frequency of the power conversion module is equal to N times of the switching frequency of each of the N power switch groups, and N is a positive integer greater than or equal to 2. Wherein the working frequency is the number of times of the energy storage element that completes charging and discharging in a unit time.

The above and other aspects of the disclosure will become better understood with regard to the following detailed description of the preferred but non-limiting embodiment (s). The following description is made with reference to the accompanying drawings.

Figure 1:
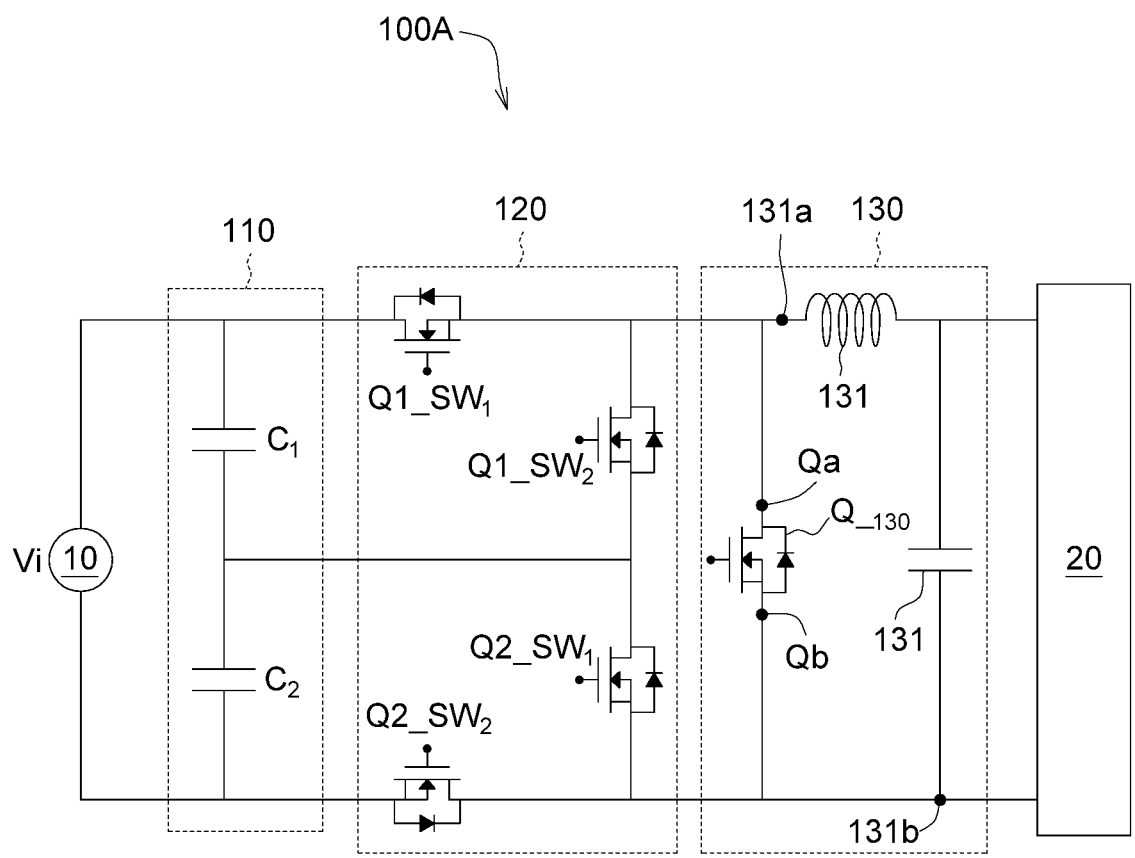
FIG. 1 is a schematic diagram of a circuit of the multi-stage buck converter 100A according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The disclosed embodiments provide a multi-stage buck converter, which could include a capacitor string, a power switch module and a power conversion module. The capacitor string includes N capacitors $C_n$ connected in series. The power switch module is coupled to the capacitor string and includes N power switch groups $SW_n$. The power conversion module is coupled to the power switch module. The working (operation) frequency $f_W$ of the power conversion module is equal to N times of the switching frequency $f_S$ of the N power switch groups $SW_n$, wherein N is a positive integer greater than or equal to 2. As a result, in one switching period of each power switch group, the power conversion module is charged and discharged for N times, and accordingly it achieves the technical effect of multiple frequency output. In addition, n is a positive integer between 1 and N, and N is any positive integer equal to or greater than 2. In the present disclosures, N could represent the number of the stage of the multi-stage buck converter, and n represents one of the N corresponding components in the multi-stage buck converter.

In an embodiment, the switching frequency $f_S$ is only required to be operated in a mid-low frequency range, and accordingly it could (1) reduce switching loss to improve power supply efficiency (increase power supply capacity), and (2). improve stability of the multi-stage buck converter 100A to reduce unstable factors caused by non-ideal characteristics. In addition, in the structure of the multi-stage buck converter, the working frequency $f_W$ of the power conversion module 130 is multiple (N) times of the switching frequency $f_S$. Therefore, the power conversion module 130 could operate in the mid-to-high frequency range to improve the power density of the multi-stage buck converter. In summary, the multi-stage buck converter of the embodiment disclosure of the present disclosure could have the dual technical effects of high power density and low switching loss. The aforementioned mid-low frequency range is, for example, smaller than F1, wherein F1 is, for example, any integer between 20 kHz and 1000 kHz, and the aforementioned mid-high frequency range is, for example, greater than F1.

The following further describes the specific/detail structure and working principle of the multi-stage buck converter.

Figure 2:
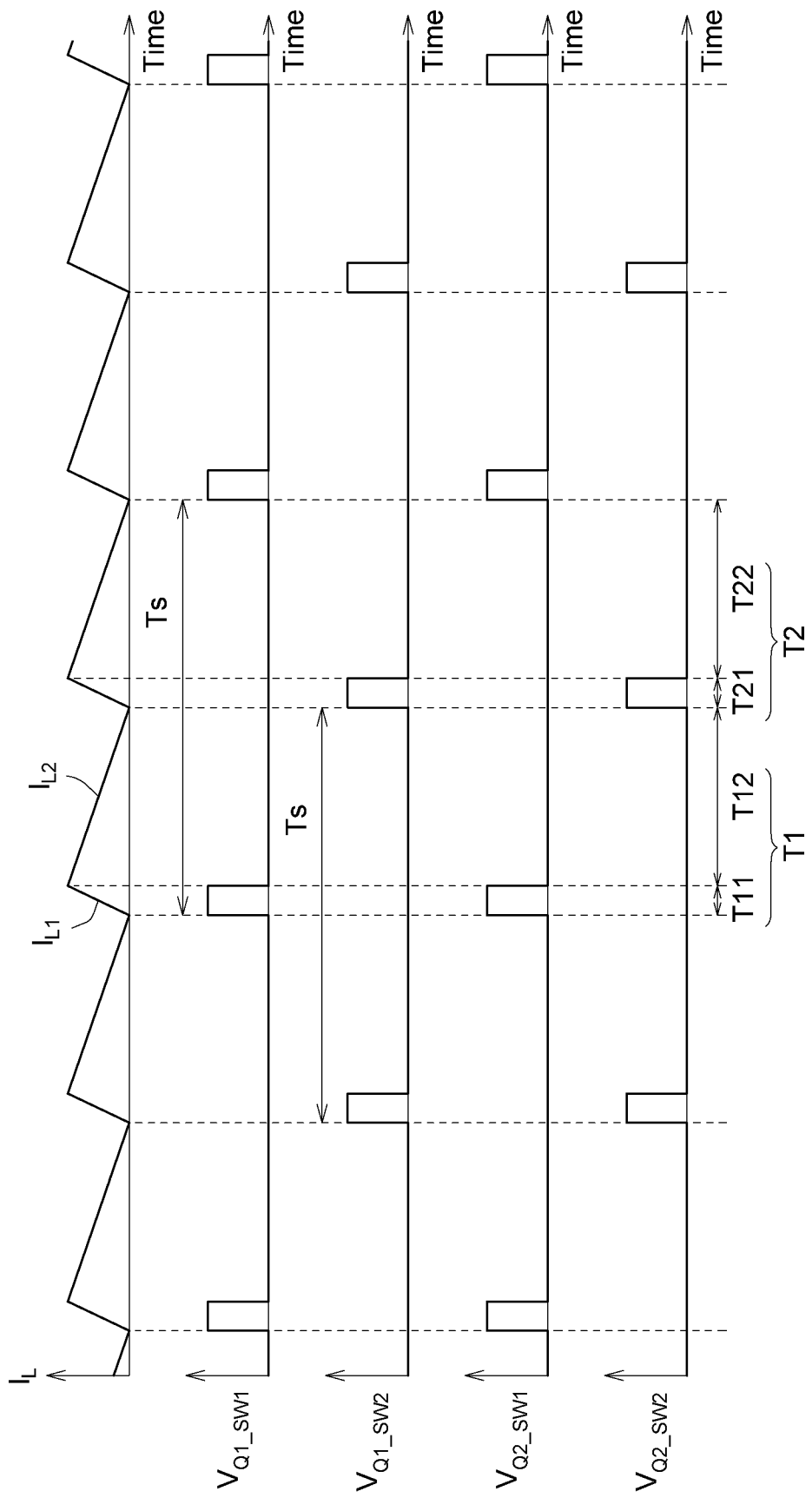
FIG. 2 is a schematic diagram of the timing of a charging and discharging current $I_L$ and the control signals $V_{Q1\_SW1}$ and $V_{Q2\_SW1}$ of the power switch group $SW_1$ and the timing of the charging and discharging current $I_L$ and the control signals $V_{Q1\_SW2}$ and $V_{Q2\_SW2}$ of the power switch group $SW_2$.

Referring to FIGS. 1 and 2, FIG. 1 is a schematic diagram of a circuit of the multi-stage buck converter 100A according to an embodiment of the present disclosure, and FIG. 2 is a schematic diagram of the timing of a charging and discharging current $I_L$ and the control signals $V_{Q1\_SW1}$ and $V_{Q2\_SW1}$ of the power switch group $SW_1$ and the timing of the charging and discharging current $I_L$ and the control signals $V_{Q1\_SW2}$ and $V_{Q2\_SW2}$ of the power switch group $SW_2$.

As illustrated in FIG. 1, the multi-stage buck converter 100A could be coupled to the power supply 10 and the load 20. The power supply 10 is, for example, a DC power supply. The multi-stage buck converter 100A could convert the DC voltage $V_i$ of the power supply 10 into a DC voltage and provide the load 20 with the DC voltage. The load 20 is, for example, a light-emitting element, such as a light-emitting diode, or other electronic devices that require power.

As illustrated in FIG. 1, the multi-stage buck converter 100A is illustrated with a 2-stage (N=2) buck converter as an example. The multi-stage buck converter 100A includes a capacitor string 110, a power switch module 120, and a power conversion module 130. The capacitor string 110 includes two (N=2) capacitors $C_1$ and $C_2$ connected in series. The power switch module 120 is coupled to the capacitor string 110 and includes two (N=2) power switch groups $SW_1$ and $SW_2$. The power conversion module 130 is coupled to the power switch module 120. The working frequency $f_W$ of the power conversion module 130 is equal to twice (N=2) of the switching frequency $f_S$ of the power switch group $SW_1$ or $SW_2$. As a result, as illustrated in FIG. 2, in one switching period $T_S$ of the power switch group $SW_1$ or $SW_2$ (the switching period $T_S$ is illustrated in FIG. 2), the power conversion module 130 could perform twice (N=2) of the charging and discharging periods T1 and T2, and accordingly it could achieve the technical effect of double frequency output.

As illustrated in FIG. 1, the switching of the power switch group $SW_n$ of the power switch module 120 could control the energy storage element of the power conversion module 120 to energy storage. The power switch group $SW_1$ of the power switch module 120 includes a first power switch $Q1\_SW_1$ and a second power switch $Q2\_SW_1$, and the power switch group $SW_2$ includes a first power switch $Q1\_SW_2$ and a second power switch $Q2\_SW_2$. The capacitor $C_1$ is coupled to the first power switch $Q1\_SW_1$ and the second power switch $Q2\_SW_1$ of the power switch group $SW_1$, and the capacitor $C_2$ is coupled to the first power switch $Q1\_SW_2$ and the second power switch $Q2\_SW_2$ of the power switch group $SW_2$. The power conversion module 130 includes a power switch Q\_130 and an energy storage element 131. The energy storage element 131 includes, for example, an inductor and/or a capacitor. In addition, the power switch herein is, for example, a metal-oxide-semiconductor field-effect transistor (MOSFET). The working frequency $f_W$ of the power conversion module 130 is the number of times of the energy storage element 131 completes charging and discharging in a unit time.

As illustrated in FIG. 1, the first terminal Qa and the second terminal Qb of the power switch Q\_130 are coupled to the two terminals of the power switch group 120 respectively, and the first terminal 131a and the second terminal 131b of the energy storage element 131 are coupled to the two terminal of the power switch module 120 respectively.

The disclosed embodiment does not limit the structure and/or type of the power conversion module 130, and it could be various power conversion structures such as Buck-Boost, Fly-back, Forward, or LLC (Logical Link Control).

In the embodiment of the present disclosure, the $n^{th}$ power switch group $SW_n$ of the N power switch groups $SW_n$ includes a first power switch $Q1\_SW_n$ and a second power switch $Q2\_SW_n$, and the $n^{th}$ capacitor $C_n$ is coupled to the first power switch $Q1\_SW_n$ and the second power switch $Q2\_SW_n$ of the $n^{th}$ power switch group $SW_n$, wherein n is a positive integer between 1 and N. In the $n^{th}$ charging interval, the first power switch $Q1\_SW_n$ and the second power switch $Q2\_SW_n$ of the $n^{th}$ power switch group $SW_n$ of the N power switch groups $SW_n$ are conducted simultaneously, while the others of the N power switch groups $SW_n$ are all non-conducted, such that $n^{th}$ capacitor $C_n$ charges the power conversion module 130 (or stores energy) through the $n^{th}$ power switch group $SW_n$. In the $n^{th}$ discharging interval, the power switch Q_130 of the power conversion module 130 is conducted, while all of the N power switch groups $SW_n$ are non-conducted, so that the power conversion module 130 discharges to the load 20 (or release energy). In the following, further description is described with FIGS. 3A to 3C.

Figure 3A:
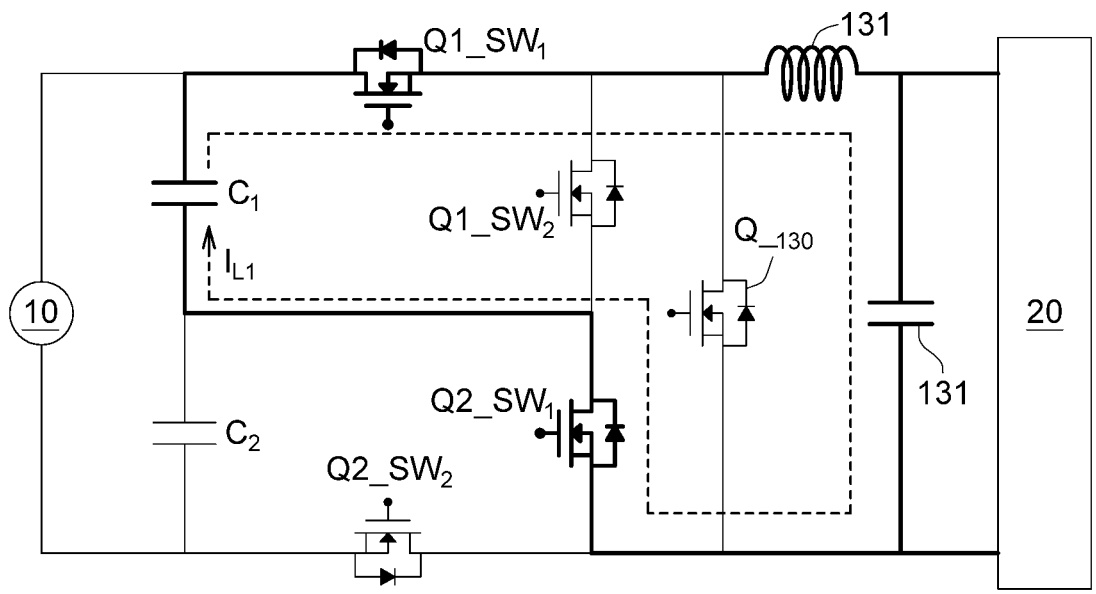
FIG. 3A is a schematic diagram of the power supply 10 of FIG. 1 charging the energy storage element 131 through the power switch group $SW_1$.
Figure 3B:
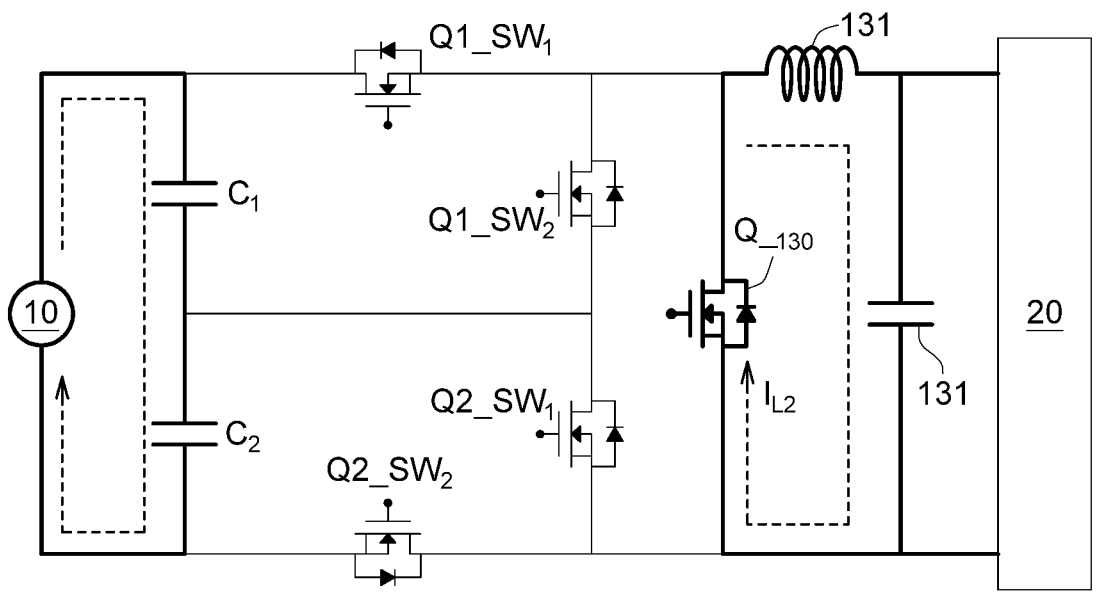
FIG. 3B is a schematic diagram of the energy storage element 131 of FIG. 3A discharging.
Figure 3C:
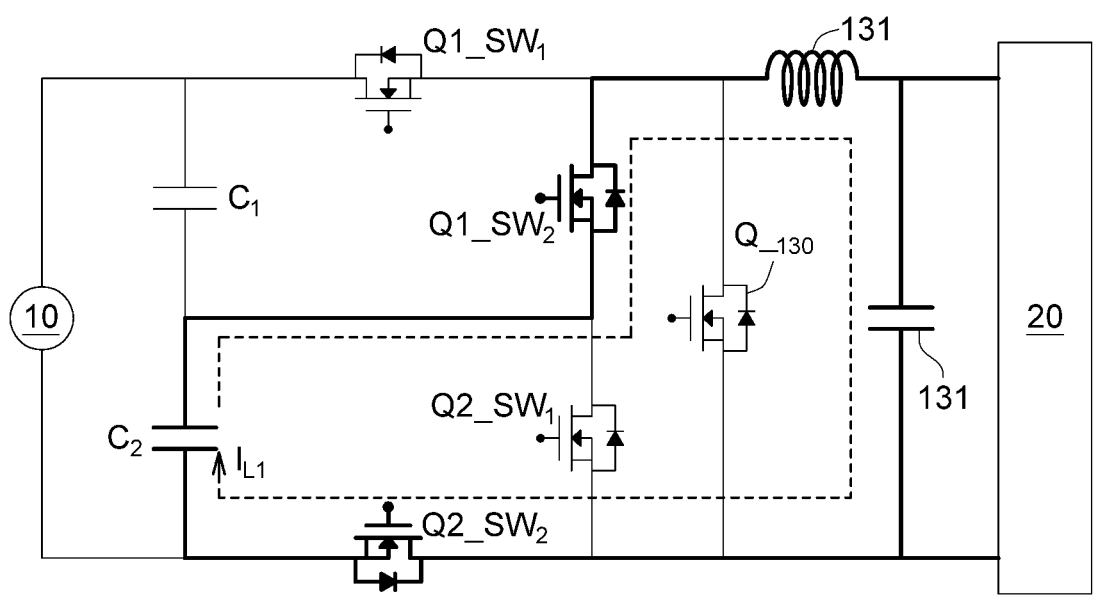
FIG. 3C is a schematic diagram of the power supply 10 of FIG. 1 charging the energy storage element 131 through the power switch group $SW_2$.

The charging and discharging of the multi-stage buck converter 100A is described with FIGS. 3A to 3C as following.

Referring to FIGS. 3A to 3C, FIG. 3A is a schematic diagram of the power supply 10 of FIG. 1 charging the energy storage element 131 through the power switch group $SW_1$, and FIG. 3B is a schematic diagram of the energy storage element 131 of FIG. 3A discharging, and FIG. 3C is a schematic diagram of the power supply 10 of FIG. 1 charging the energy storage element 131 through the power switch group $SW_2$.

As illustrated in FIG. 3A, in the first (n=1) charging interval T11 of the first (n=1) charging and discharging period T1 (the charging interval T11 is illustrated in FIG. 2), the first power switch $Q1\_SW_1$ and the second power switch $Q2\_SW_1$ of the power switch group $SW_1$ are conducted simultaneously, while the first power switch $Q1\_SW_2$, the second power switch $Q2\_SW_2$ of the power switch group $SW_2$ and the power switch Q_130 of the power conversion module 130 are non-conducted. As a result, the capacitor $C_1$, the power switch group $SW_1$, and the energy storage element 131 form a loop (illustrated as a thick solid line), and the charging current $I_{L1}$ charges the energy storage element 131 through such loop.

As illustrated in FIG. 3B, in the first (n=1) discharging interval T12 of the first (n=1) charging and discharging period T1 (the discharging interval T12 is illustrated in FIG. 2), the first power switch $Q1\_SW_1$ and the second power switch $Q2\_SW_1$ of the power switch group $SW_1$, the first power switch $Q1\_SW_2$ and the second power switch $Q2\_SW_2$ of the power switch group $SW_2$ are non-conducted, while the power switch Q_130 of the power conversion module 130 is conducted, so the power switch Q_130 and the energy storage element 131 form a loop (illustrated as a thick solid line), and the energy storage element 131 releases the discharging current $I_{L2}$ and supplies power to the load 20 through such loop. In addition, in the discharging interval, the power supply 10 charges the capacitors $C_1$ and $C_2$ simultaneously.

In summary, in the multi-stage buck converter 100A, in the discharging interval, the power switch Q_130 of the power conversion module 130 is conducted, while the two power switch groups $SW_1$ and $SW_2$ are both non-conducted, so that the power conversion module 130 discharges.

As illustrated in FIG. 3C, in the second (n=2) charging interval T21 of the second (n=2) charging and discharging period T2 (the charging interval T21 is illustrated in FIG. 2), the first power switch $Q1\_SW_2$ and the second power switch $Q2\_SW_2$ of the power switch group $SW_2$ are conducted, while the first power switch $Q1\_SW_1$ and the second power switch $Q2\_SW_1$ of the power switch group $SW_1$ and the power switch Q_130 of the power conversion module 130 are non-conducted. As a result, the capacitor $C_2$, the power switch group $SW_2$, and the energy storage element 131 form a loop (illustrated as a thick solid line), and the charging current $I_{L1}$ charges the energy storage element 131 through such loop.

Similar to the working mode of FIG. 3B, in the second (n=2) discharging interval T22 of the second (n=2) charging and discharging period T2 (the discharging interval T22 is illustrated in FIG. 2), the first power switch $Q1\_SW_1$ and the second power switch $Q2\_SW_1$ of the power switch group $SW_1$ and the first power switch $Q1\_SW_2$ and the second power switch $Q2\_SW_2$ of the power switch group $SW_2$ are non-conducted, and the power switch Q_130 of the power conversion module 130 is conducted. As a result, the power switch Q_130 and the energy storage element 131 form a loop (illustrated with a thick solid line), and the energy storage element 131 releases the discharging current $I_{L2}$ and supplies power to the load 20 through such loop. Similarly, in such discharging interval, the power supply 10 could charge the capacitors $C_1$ and $C_2$ simultaneously.

As illustrated in FIG. 2, the aforementioned first charging interval T11 and the first discharging interval T12 constitute the first charging and discharging period T1, and the second charging interval T21 and the second discharging interval T22 constitute the second charging and discharging period. In the switching period $T_S$ in which the power switch groups $SW_1$ and $SW_2$ each actuates once, the power conversion module 130 is charged and discharged twice for achieving the technical effect of double frequency output.

Figure 4:
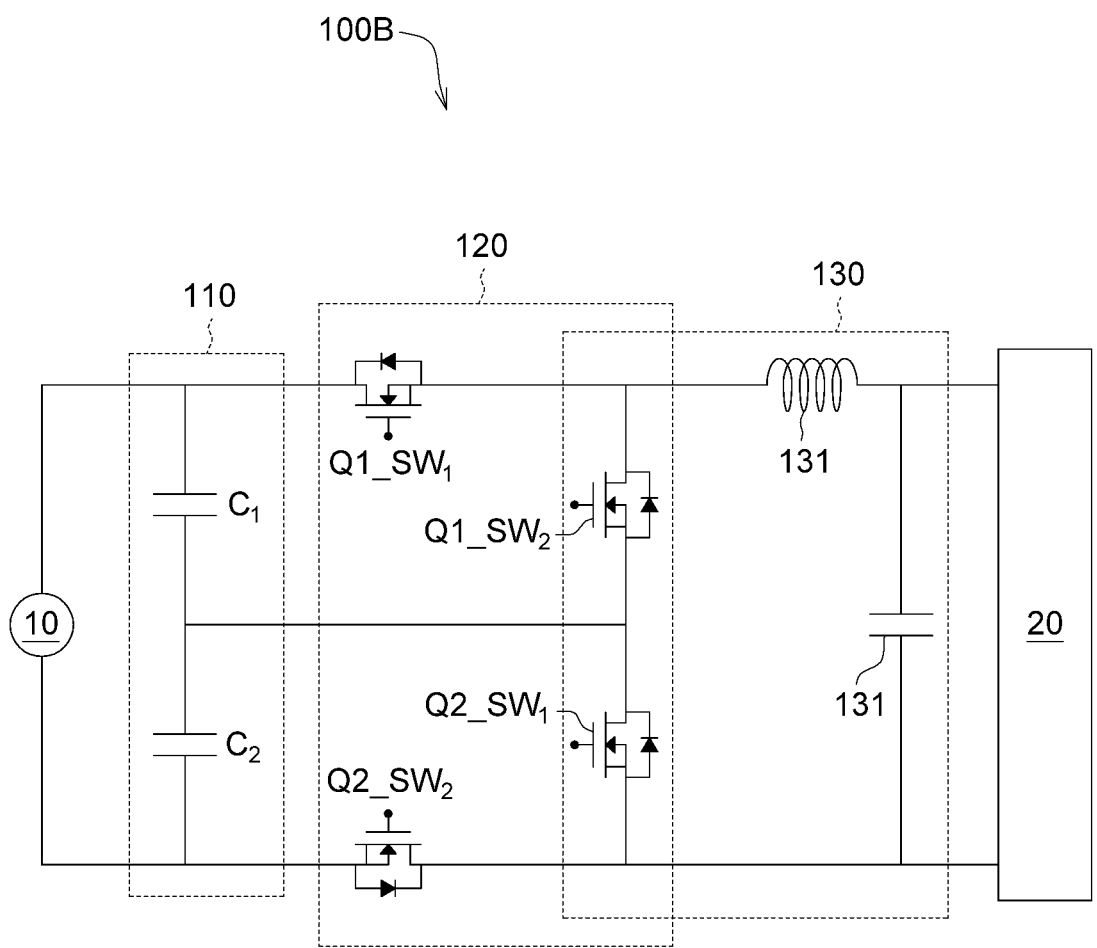
FIG. 4 is a schematic diagram of a circuit of a multi-stage buck converter 100B according to an embodiment of the present disclosure.
Figure 5:
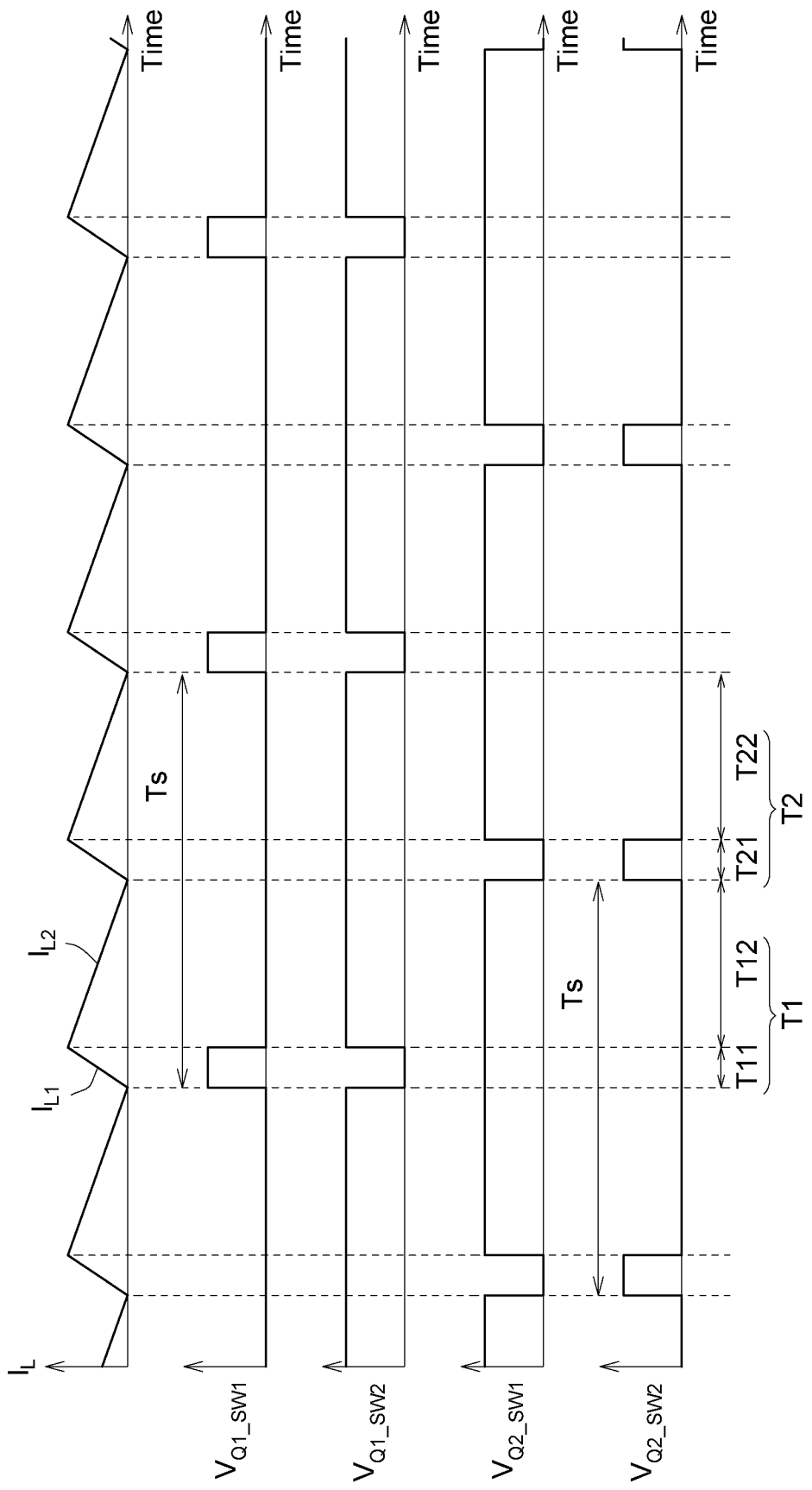
FIG. 5 is a schematic diagram of the timing of a charging and discharging current $I_L$ and the control signals $V_{Q1\_SW1}$ and $V_{Q2\_SW1}$ of the power switch group $SW_1$ and the timing of the charging and discharging current $I_L$ and the control signals $V_{Q1\_SW2}$ and $V_{Q2\_SW2}$ of the power switch group $SW_2$ of the multi-stage buck converter 100B of FIG. 4.

Referring to FIGS. 4 to 5. FIG. 4 is a schematic diagram of a circuit of a multi-stage buck converter 100B according to an embodiment of the present disclosure, and FIG. 5 is a schematic diagram of the timing of a charging and discharging current $I_L$ and the control signals $V_{Q1\_SW1}$ and $V_{Q2\_SW1}$ of the power switch group $SW_1$ and the timing of the charging and discharging current $I_L$ and the control signals $V_{Q1\_SW2}$ and $V_{Q2\_SW2}$ of the power switch group $SW_2$ of the multi-stage buck converter 1008 of FIG. 4.

The multi-stage buck converter 100B is a 2-stage (N=2) buck converter. The multi-stage buck converter 1008 includes the capacitor string 110, the power switch module 120 and the power conversion module 130. The capacitor string 110 includes two (N=2) capacitors $C_1$ and $C_2$ connected in series. The power switch module 120 is coupled to the capacitor string 110 and includes two (N=2) power switch groups $SW_1$ and $SW_2$. The power conversion module 130 is coupled to the power switch module 120. The working frequency $f_W$ of the power conversion module 130 is equal to twice (N=2) of the switching frequency $f_S$ of the power switch group $SW_1$ or $SW_2$. As a result, as illustrated in FIG. 5, in one switching period $T_S$ of the power switch group $SW_1$ or $SW_2$ (the switching period $T_S$ is illustrated in FIG. 5), the power conversion module 130 performs the charging and discharging periods T1 and T2 for two times for achieving the technical effect of double frequency output.

The multi-stage buck converter 100B has the same or similar technical features as the multi-stage buck converter 100A. The power conversion module 130 and the power switch module 120 of the multi-stage buck converter 100B share at least one element, for example, one of the power switches of each power switch group $SW_n$. Specifically, the power conversion module 130 and the power switch module 120 of the multi-stage buck converter 100B share the second power switch Q2_SW$_1$ of the power switch group SW$_1$ and the first power switch Q1_SW$_2$ of the power switch group SW$_2$. One or some of the shared power switches is/are conducted during the charging interval and the discharging interval.

Figure 6A:
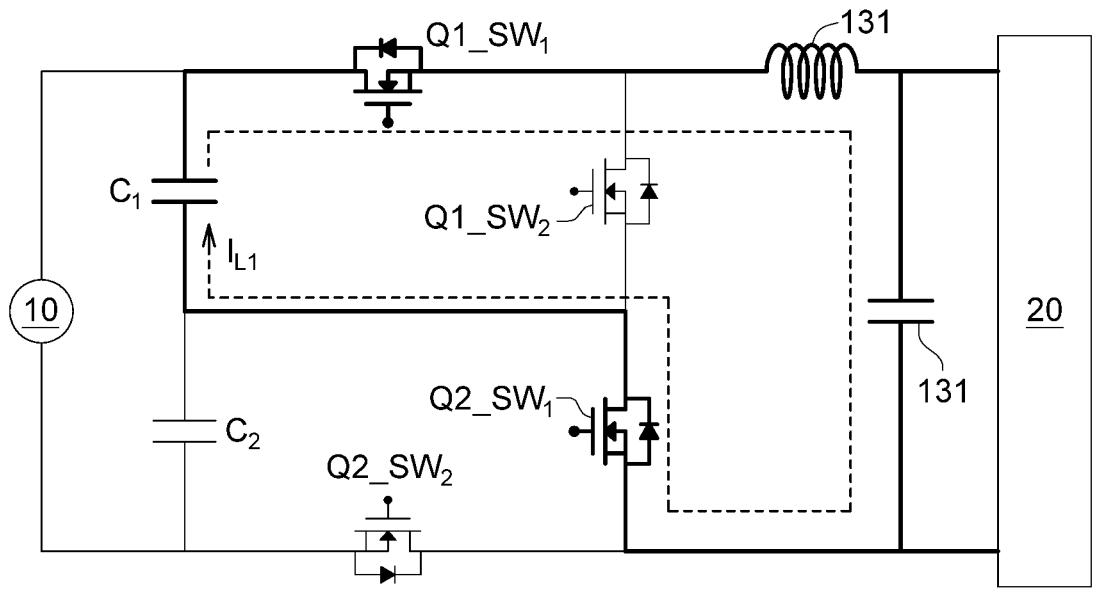
FIG. 6A is a schematic diagram of the power supply 10 of FIG. 4 charging the energy storage element 131 through the power switch group $SW_1$.
Figure 6B:
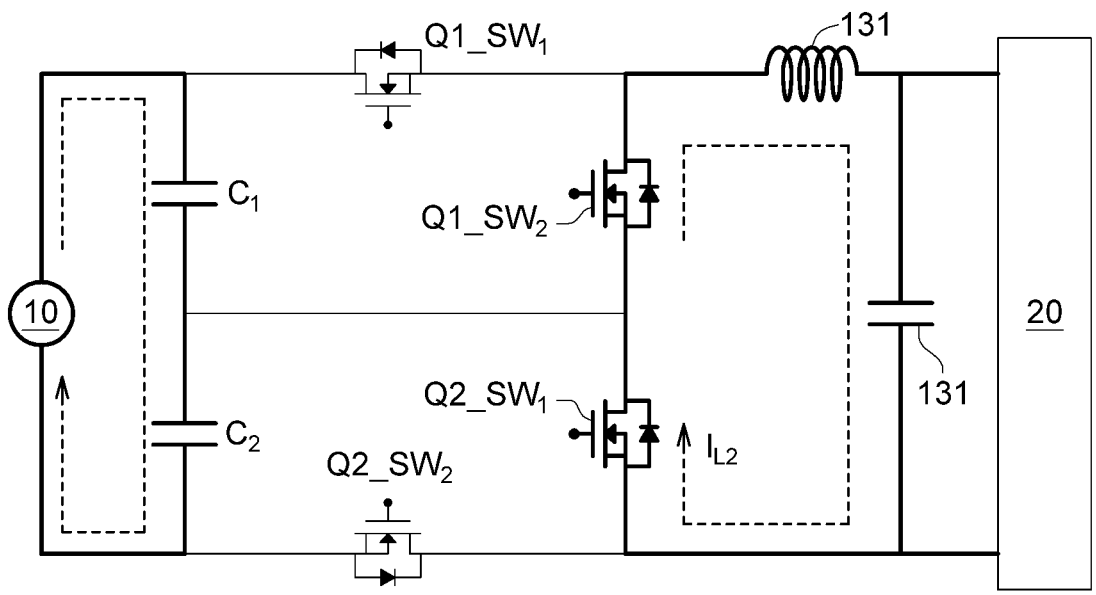
FIG. 6B is a schematic diagram of the energy storage element 131 of FIG. 6A discharging.
Figure 6C:
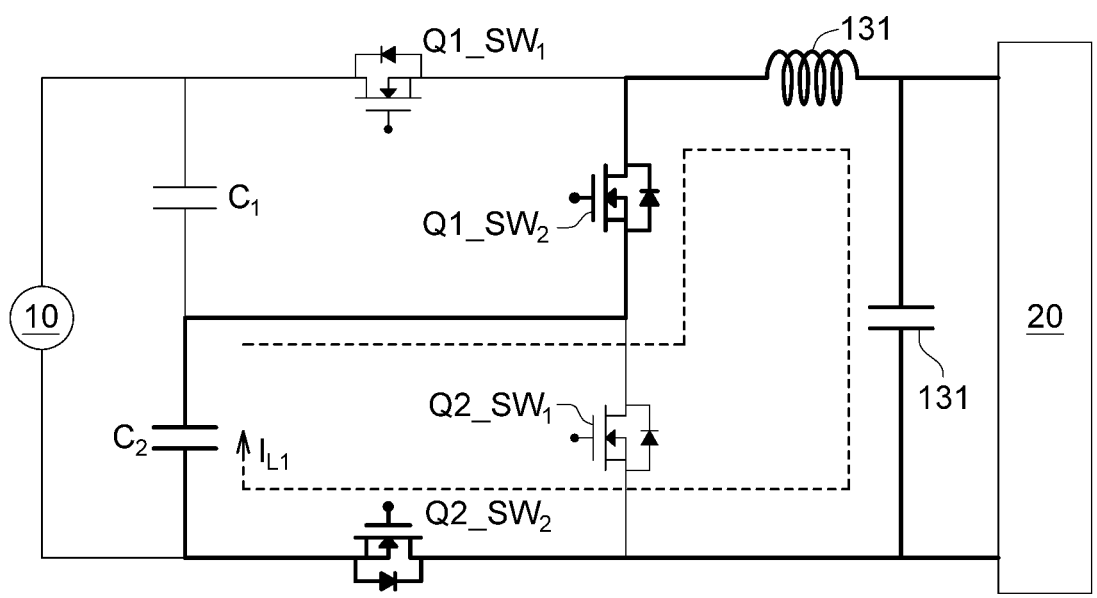
FIG. 6C is a schematic diagram of the power supply 10 of FIG. 4 charging the energy storage element 131 through the power switch group $SW_2$.

The following describes the charging and discharging operation of the multi-stage buck converter 100B with FIGS. 6A to 6C.

Referring to FIGS. 6A to 6C, FIG. 6A is a schematic diagram of the power supply 10 of FIG. 4 charging the energy storage element 131 through the power switch group SW$_1$, and FIG. 6B is a schematic diagram of the energy storage element 131 of FIG. 6A discharging, and FIG. 6C is a schematic diagram of the power supply 10 of FIG. 4 charging the energy storage element 131 through the power switch group SW$_2$.

As illustrated in FIG. 6A, in the first (n=1) charging interval T11 of the first (n=1) charging and discharging period T1 (the charging interval T11 is illustrated in FIG. 5), the first power switch Q1_SW$_1$ and the second power switch Q2_SW$_1$ of the power switch group SW1 are conducted, while the first power switch Q1_SW$_2$ and the second power switch Q2_SW$_2$ of the power switch group SW$_2$ are non-conducted. As a result, the capacitor C$_1$, the power switch group SW$_1$ and the energy storage element 131 form a loop (illustrated as a thick solid line), and the charging current I$_{L1}$ charges the energy storage element 131 through such loop.

As illustrated in FIG. 6B, in the first (n=1) discharging interval T12 of the first (n=1) charging and discharging period T1 (the discharging interval T12 is illustrated in FIG. 5), the first power switch Q1_SW$_1$ of the power switch group SW$_1$ and the second power switch Q2_SW$_2$ of the power switch group SW$_2$ are non-conducted, while the first power switch Q1_SW$_2$ of the power switch group SW$_2$ and the second power switch Q2_SW$_1$ of the power switch group SW$_1$ are conducted. As a result, the first power switch Q1_SW$_2$, the second power switch Q2_SW$_1$ and the energy storage element 131 form a loop (illustrated with a thick solid line), and the energy storage element 131 releases the discharging current I$_{L2}$ and supplies power to the load 20 through such loop.

In summary, in the discharging interval, the power switches of two (N=2) power switch groups (for example, the power switch groups SW$_1$ and SW$_2$) (i.e., shared power switches, such as the first power switch Q1_SW$_2$ and the second power switch Q2_SW$_1$) are conducted, but the others of the power switches of the two (N=2) power switch groups (i.e., non-shared power switches, such as the first power switch Q1_SW$_1$ and the second power switch Q2_SW$_2$) are non-conducted, so that the power conversion module 130 is discharged to supply power to the load 20.

As illustrated in FIG. 6C, in the second (n=2) charging interval T21 of the second (n=2) charging and discharging period T2 (the charging interval T21 is illustrated in FIG. 5), the first power switch Q1_SW$_2$ and the second power switch Q2_SW$_2$ of the power switch group SW$_2$ are conducted, while the first power switch Q1_SW$_1$ and the second power switch Q2_SW$_1$ of the power switch group SW$_1$ are non-conducted. As a result, the capacitor C$_2$, the power switch group SW$_2$ and the energy storage element 131 form a loop (illustrated as a thick solid line), and the charging current I$_{L1}$ charges the energy storage element 131 through such loop.

Similar to the working mode of FIG. 6B, in the second (n=2) discharging interval T22 of the second (n=2) charging and discharging period T2 (discharging interval T22 is illustrated in FIG. 5), the first power switch Q1_SW$_1$ of the power switch group SW$_1$ and the second power switch Q2_SW$_2$ of the power switch group SW$_2$ are non-conducted, while the first power switch Q1_SW$_2$ of the power switch group SW$_2$ and the second power switch Q2_SW$_1$ of the power switch group SW$_1$ are conducted. As a result, the first power switch Q1_SW$_2$, the second power switch Q2_SW$_1$ and the energy storage element 131 form a loop (illustrated as a thick solid line), and the energy storage element 131 releases the discharging current I$_{L2}$ and supplies power to the load 20 through such loop.

Figure 7:
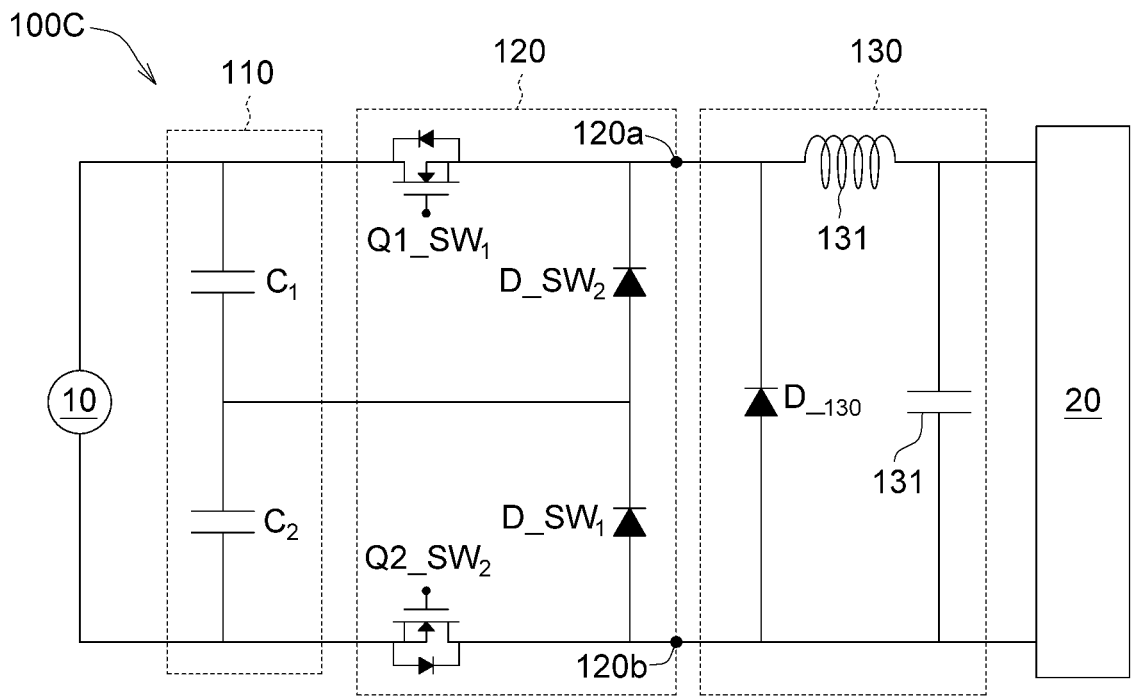
FIG. 7 is a schematic diagram of a circuit of a multi-stage buck converter 100C according to another embodiment of the present disclosure.

Referring to FIG. 7, FIG. 7 is a schematic diagram of a circuit of a multi-stage buck converter 100C according to another embodiment of the present disclosure.

The multi-stage buck converter 100C is a 2-stage (N=2) buck converter. The multi-stage buck converter 100C includes the capacitor string 110, the power switch module 120 and the power conversion module 130. The capacitor string 110 includes two (N=2) capacitors C$_1$ and C$_2$ connected in series. The power switch module 120 is coupled to the capacitor string 110 and includes two (N=2) power switch groups SW$_1$ and SW$_2$. The power conversion module 130 is coupled to the power switch module 120. The working frequency f$_W$ of the power conversion module 130 is equal to twice (N=2) of the switching frequency f$_S$ of the power switch group SW$_1$ or SW$_2$. Similar to the aforementioned multi-stage buck converter 100A, in one switching period T$_S$ of the power switch group SW$_1$ or SW$_2$, the power conversion module 130 performs the charging and discharging periods for two times (N=2) for achieving the technical effect of double frequency output.

The multi-stage buck converter 100C has the same or similar technical features as the multi-stage buck converter 100A. However, it should be noted that each of the power switch module 120 and the power conversion module 130 of the multi-stage buck converter 100C include at least one diode. For example, the power switch group SW$_1$ includes the first power switch Q1_SW$_1$ and a diode D_SW$_1$, the power switch group SW$_2$ includes the second power switch Q2_SW$_2$ and a diode D_SW$_2$, and the power conversion module 130 includes a diode D_130. Compared with the aforementioned multi-stage buck converter 100A, the second power switch Q2_SW$_1$ of the power switch group SW$_1$ of the present embodiment is replaced by the diode D_SW$_1$, and the first power switch Q1_SW$_2$ of the power switch group SW$_2$ is replaced by a diode D_SW$_2$. The first terminal 120a and the second terminal 120b of the power switch module 120 are coupled to two terminals of the diode D_130 respectively.

In addition, for the two power switches of the power switch group SW$_n$, only those whose direction of a positive electrode (p electrode) of a body diode of the power switch toward a negative electrode (n electrode) of the body diode is the same as the current direction could be replaced by the diode. For example, for the first power switch Q1_SW$_1$ of the power switch group SW$_1$, its direction of the positive electrode of the body diode toward the negative electrode of the body diode is reverse to the current direction, and thus the first power switch Q1_SW$_1$ is not suitable to be replaced by the diode. For the second power switch Q2_SW$_1$ (refer to FIG. 1), its direction of the positive electrode of the body diode toward the negative electrode of the body diode is the same as the current direction, and thus the second power switch Q2_SW$_1$ could be replaced by the diode.

In terms of control, each power switch group SW$_n$ of the multi-stage buck converter 100C only needs to control one power switch to conduct or non-conduct for achieving the technical effect of double (N=2) frequency output. For example, it only needs to control the first power switch Q1_SW$_1$ of the power switch group SW$_1$ to be conducted or non-conducted, and it only needs to control the second power switch Q2_SW$_2$ of the power switch group SW$_2$ to conduct or non-conduct for achieving the technical effect of double frequency output.

Figure 8:
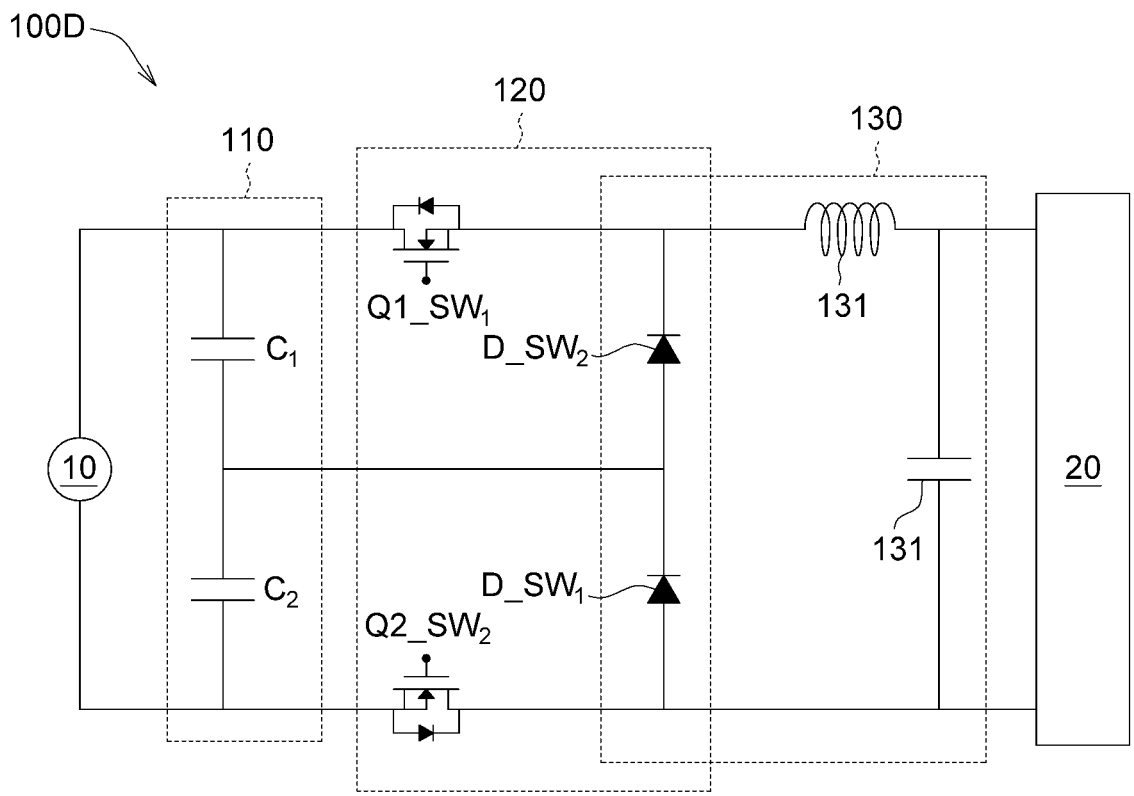
FIG. 8 is a schematic diagram of a circuit of a multi-stage buck converter 100D according to another embodiment of the present disclosure.

Referring to FIG. 8, FIG. 8 is a schematic diagram of a circuit of a multi-stage buck converter 100D according to another embodiment of the present disclosure.

The multi-stage buck converter 100D is a 2-stage (N=2) buck converter. The multi-stage buck converter 100D includes the capacitor string 110, the power switch module 120 and the power conversion module 130. The capacitor string 110 includes two (N=2) capacitors C$_1$ and C$_2$ connected in series. The power switch module 120 is coupled to the capacitor string 110 and includes two (N=2) power switch groups SW$_1$ and SW$_2$. The power conversion module 130 is coupled to the power switch module 120. The working frequency f$_W$ of the power conversion module 130 is equal to twice (N=2) of the switching frequency f$_S$ of the power switch group SW$_1$ or SW$_2$. As a result, similar to the aforementioned multi-stage buck converter 100B, in one switching period T$_S$ of the power switch group SW$_1$ or SW$_2$, the power conversion module 130 performs the charging and discharging periods for two times for achieving the technical effect of double frequency output.

The multi-stage buck converter 100D has the technical features the same as or similar to that of the multi-stage buck converter 100C. It should be noted that the power switch module 120 and the power conversion module 130 of the multi-stage buck converter 100D share some components. For example, the power switch module 120 and the power conversion module 130 share diodes D_SW$_1$ and D_SW$_2$. In addition, the power conversion module 130 could omit the diode D_130.

Figure 9:
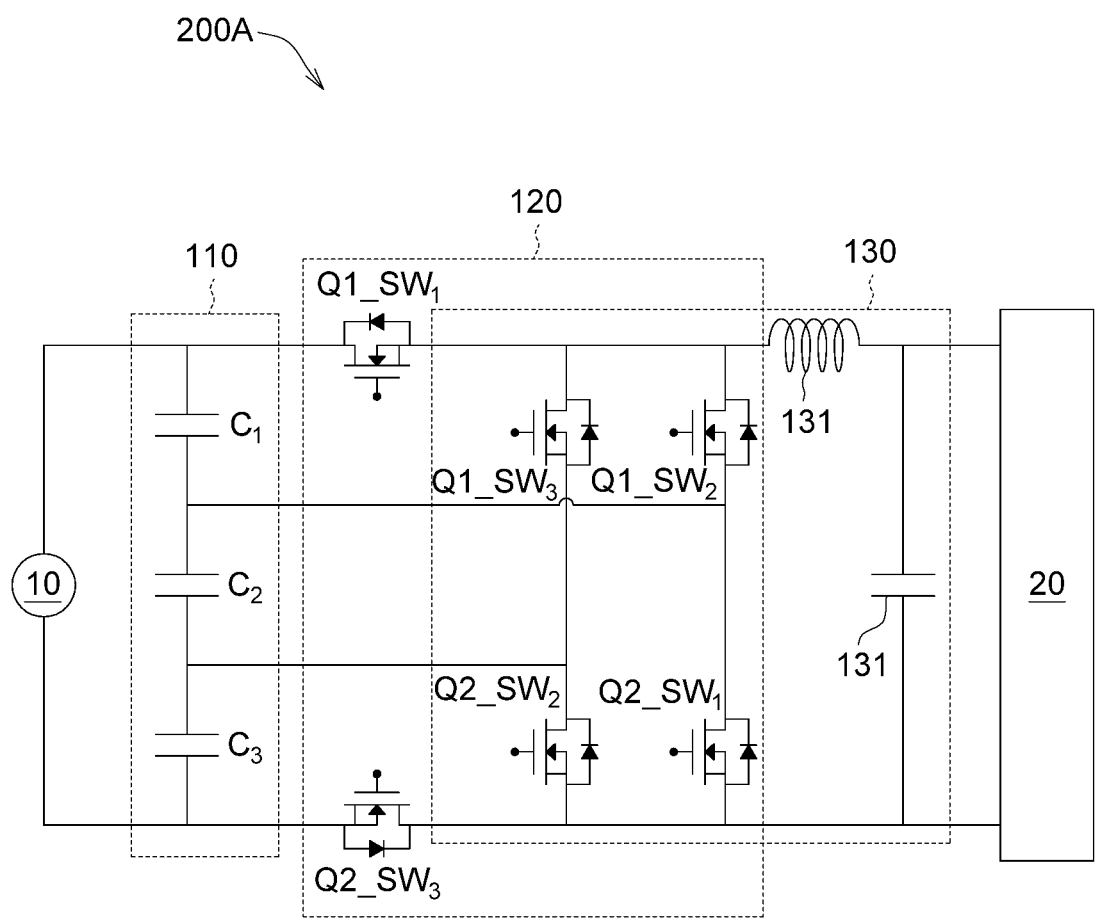
FIG. 9 is a schematic diagram of a circuit of a multi-stage buck converter 200A according to another embodiment of the present disclosure.

Referring to FIG. 9, FIG. 9 is a schematic diagram of a circuit of a multi-stage buck converter 200A according to another embodiment of the present disclosure.

The multi-stage buck converter 200A is a 3-stage (N=3) buck converter. The multi-stage buck converter 200A includes the capacitor string 110, the power switch module 120 and the power conversion module 130. The capacitor string 110 includes three (N=3) capacitors C$_1$ to C$_3$ connected in series. The power switch module 120 is coupled to the capacitor string 110 and includes three (N=3) power switch groups SW$_1$ to SW$_3$. The power conversion module 130 is coupled to the power switch module 120. The working frequency f$_W$ of the power conversion module 130 is equal to three times (N=3) of the switching frequency f$_S$ of the power switch group SW$_1$, SW$_2$ or SW$_3$. As a result, similar to the aforementioned timing control method, in one switching period T$_S$ of the power switch group SW$_1$, SW$_2$ or SW$_3$, the power conversion module 130 could perform the charging and discharging periods for three times (N=3) for achieving the technical effect of triple frequency output.

In the present embodiment, the power switch module 120 and the power conversion module 130 share some components. For example, the power switch module 120 and the power conversion module 130 share at least one of the power switches Q2_SW$_1$, Q1_SW$_2$, Q2_SW$_2$ and Q1_SW$_3$. One or some of the shared power switches will be conducted during the charging interval and the discharging interval.

Figure 10A:
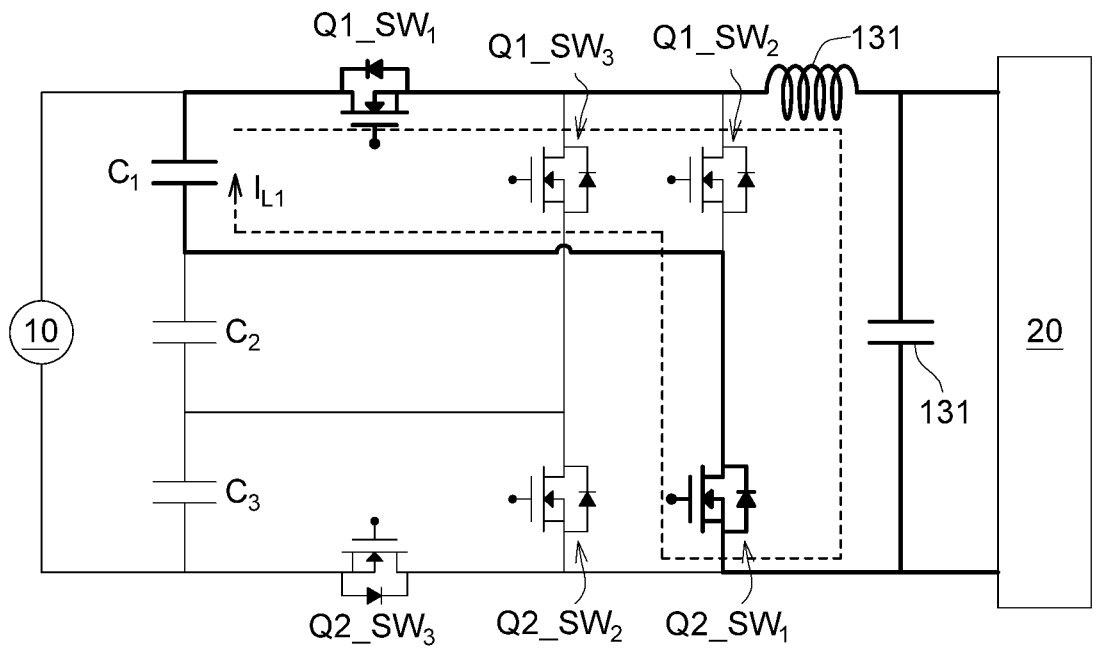
FIG. 10A is a schematic diagram of the power supply 10 of FIG. 9 charging the energy storage element 131 through the power switch group $SW_1$.
Figure 10B:
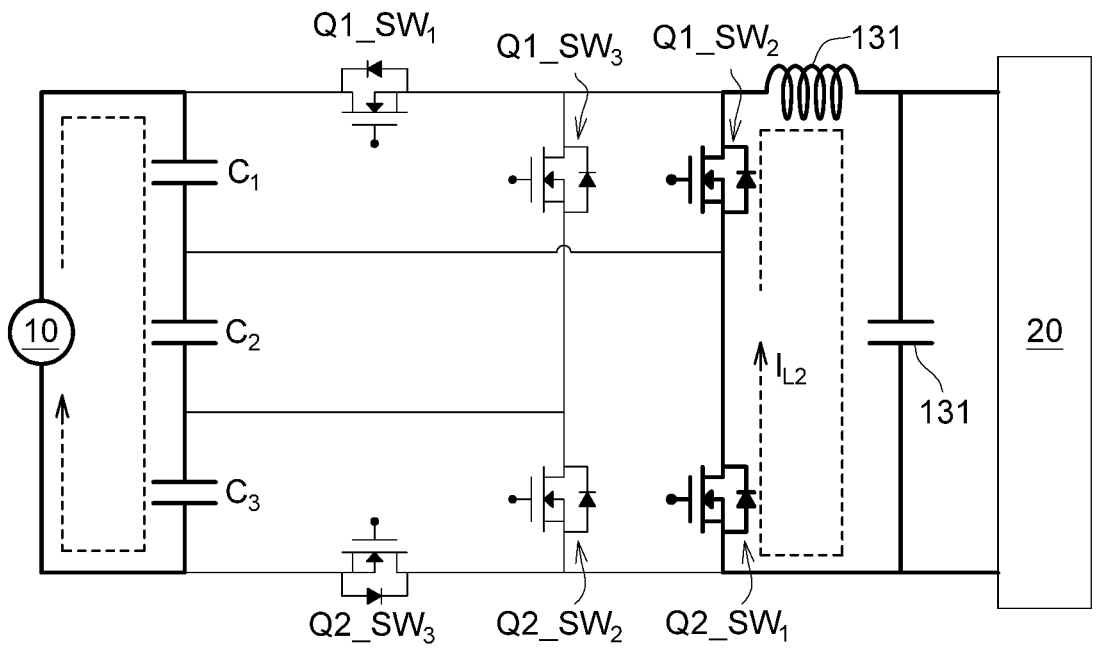
FIG. 10B is a schematic diagram of the energy storage element 131 of FIG. 10A discharging.
Figure 10C:
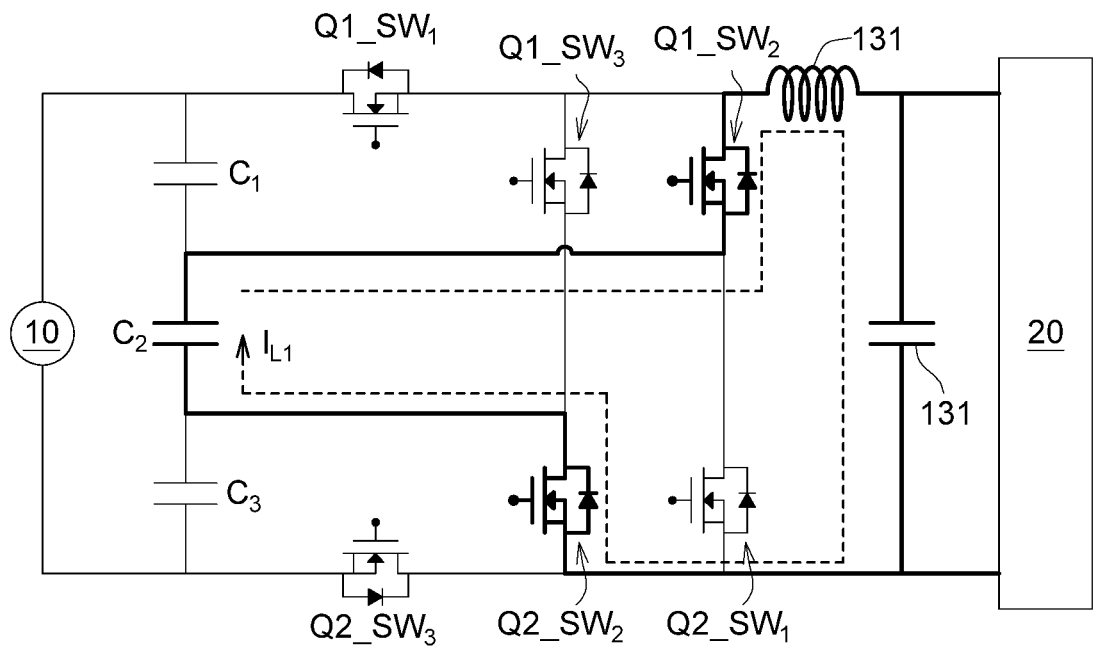
FIG. 10C is a schematic diagram of the power supply 10 of FIG. 9 charging the energy storage element 131 through the power switch group $SW_2$.
Figure 10D:
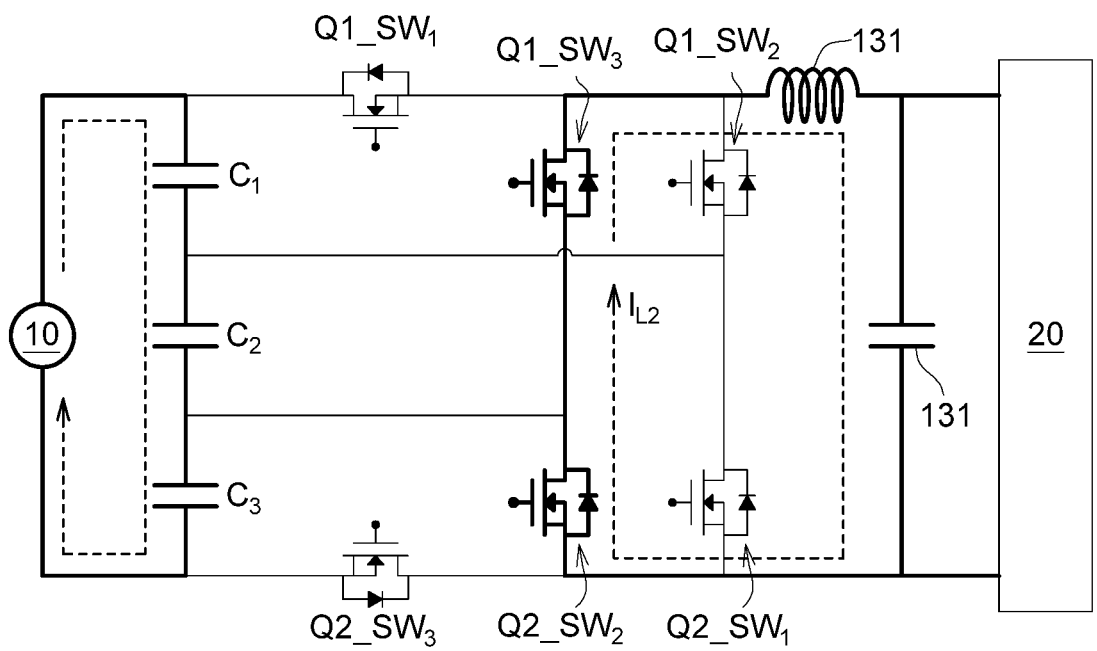
FIG. 10D is a schematic diagram of the energy storage element 131 of FIG. 10C discharging.
Figure 10E:
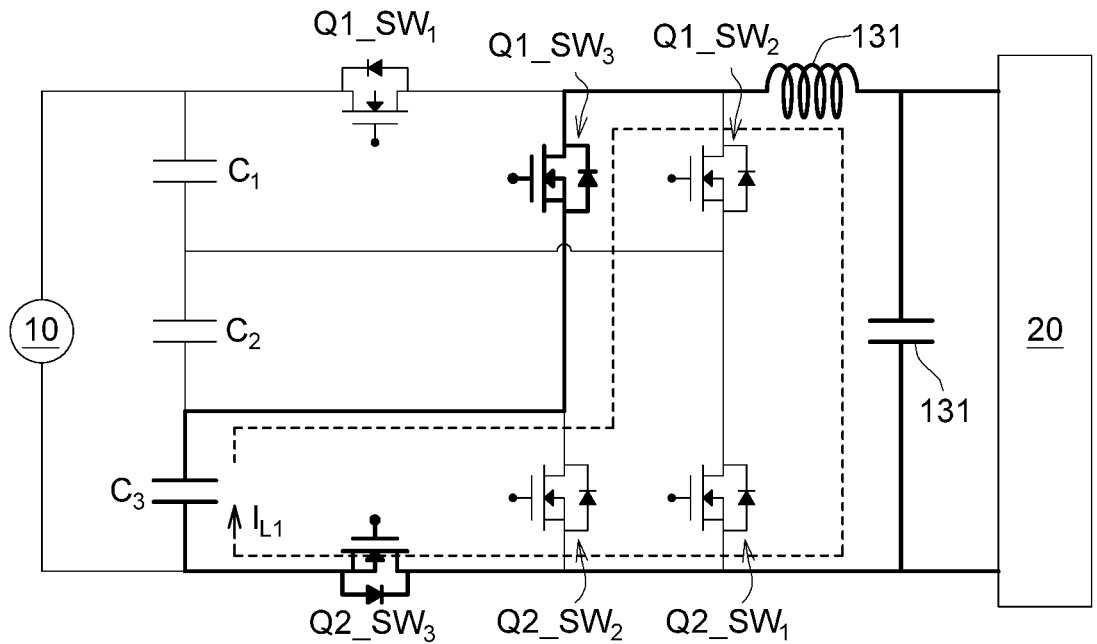
FIG. 10E is a schematic diagram of the power supply 10 charging the energy storage element 131 through the power switch group $SW_3$ of FIG. 9.

Referring to FIGS. 10A to 10E, FIG. 10A is a schematic diagram of the power supply 10 of FIG. 9 charging the energy storage element 131 through the power switch group SW$_1$, and FIG. 10B is a schematic diagram of the energy storage element 131 of FIG. 10A discharging, FIG. 10C is a schematic diagram of the power supply 10 of FIG. 9 charging the energy storage element 131 through the power switch group SW$_2$, FIG. 10D is a schematic diagram of the energy storage element 131 of FIG. 10C discharging, and FIG. 10E is a schematic diagram of the power supply 10 charging the energy storage element 131 through the power switch group SW$_3$ of FIG. 9.

The timing control principle of the multi-stage buck converter 200A is similar to the timing control principle of FIG. 5, and will not be repeated here.

As illustrated in FIG. 10A, in the first (n=1) charging interval of the first (n=1) charging and discharging period, the first power switch Q1_SW$_1$ and the second power switch Q2_SW$_1$ of the power switch group SW$_1$ are conducted simultaneously, while the first power switch Q1_SW$_2$, the second power switch Q2_SW$_2$ of the power switch group SW$_2$, the first power switch Q1_SW$_3$ and the second power switch Q2_SW$_3$ of the power switch group SW$_3$ are non-conducted. As a result, the capacitor C$_1$, the power switch group SW$_1$ and the energy storage element 131 form a loop (illustrated as a thick solid line), and the charging current I$_{L1}$ charges the energy storage element 131 through such loop.

As illustrated in FIG. 10B, in the first (n=1) discharging interval of the first (n=1) charging and discharging period, the first power switch Q1_SW$_1$ of the power switch group SW$_1$, the second power switch Q2_SW$_2$ of the power switch group SW$_2$ and the first power switch Q1_SW$_3$ and the second power switch Q2_SW$_3$ of the power switch group SW$_3$ are non-conducted, while the second power switch Q2_SW$_1$ of the power switch group SW$_1$ and the first power switch Q1_SW$_2$ of the power switch group SW$_2$ are conducted. As a result, the first power switch Q1_SW$_2$, the second power switch Q2_SW$_1$ and the energy storage element 131 form a loop (illustrated as a thick solid line), and the energy storage element 131 releases the discharging current I$_{L2}$ to supply power to the load 20 through such loop. In addition, in the discharging interval, the power supply 10 charges the capacitors C$_1$, C$_2$, and C$_3$ simultaneously.

In summary, in the discharging interval, the power switches (e.g., the first power switch Q1_SW$_2$ and the second power switch Q2_SW$_1$) of two (for example, power switch groups SW$_1$ and SW$_2$) of the three (N=3) power switch groups are conducted, while the others of the power switches (for example, the first power switch Q1_SW$_1$, the second power switch Q2_SW$_2$, the first power switch Q1_SW$_3$ and the second power switch Q2_SW$_3$) of the three (N=3) power switch groups are non-conducted, so that the power conversion module 130 is discharged to supply power to the load 20.

In another embodiment, in the discharging interval of the first (n=1) charging and discharging period, the power switch module 120 could also use the switching mode illustrated in FIG. 10D to control the power conversion module 130 to discharge, and the details will be described later.

As illustrated in FIG. 10C, in the second (n=2) charging interval of the second (n=2) charging and discharging period, the first power switch Q1_SW$_2$ and the second power switch Q2_SW$_2$ of the power switch group SW$_2$ are conducted simultaneously, while the first power switch Q1_SW$_1$ and the second power switch Q2_SW$_1$ of the power switch group SW$_1$, and the first power switch Q1_SW$_3$ and the second power switch Q2_SW$_3$ of the power switch group SW$_3$ are non-conducted. As a result, the capacitor C$_2$, the power switch group SW$_2$ and the energy storage element 131 form a loop (illustrated as a thick solid line), and the charging current $I_{L1}$ charges the energy storage element 131 through such loop.

As illustrated in FIG. 10D, in the second (n=2) discharging interval of the second (n=2) charging and discharging period, the first power switch Q1_SW$_1$ and the second power switch Q2_SW$_1$ of the power switch group SW$_1$, the first power switch Q1_SW$_2$ of the power switch group SW$_2$, and the second power switch Q2_SW$_3$ of the power switch group SW$_3$ are non-conducted, while the first power switch Q1_SW$_3$ of the power switch group SW$_3$ and the second power switch Q2_SW$_2$ of the power switch group SW$_2$ are conducted. As a result, the first power switch Q1_SW$_3$, the second power switch Q2_SW$_2$, and the energy storage element 131 form a loop (illustrated as a thick solid line), and the energy storage element 131 releases the discharging current $I_{L2}$ to supply power to the load 20 through this loop. In addition, in the discharging interval, the power supply 10 charges the capacitors $C_1$, $C_2$, and $C_3$ simultaneously.

In another embodiment, in the discharging interval of the second (n=2) charging and discharging period, the power switch module 120 could control the discharging of the power conversion module 130 by adopting the switching mode illustrated in FIG. 10B.

As illustrated in FIG. 10E, in the third (n=3) charging interval of the third (n=3) charging and discharging period, the first power switch Q1_SW$_3$ and the second power switch Q2_SW$_3$ of the power switch group SW$_3$ are conducted simultaneously, while the first power switch Q1_SW$_1$ and the second power switch Q2_SW$_1$ of the power switch group SW$_1$, the first power switch Q1_SW$_2$ and the second power switch Q2_SW$_2$ of the power switch group SW$_2$ are non-conducted. As a result, the capacitor $C_3$, the power switch group SW$_3$, and the energy storage element 131 form a loop (illustrated as a thick solid line), and the charging current $I_{L1}$ charges the energy storage element 131 through such loop.

Similar to the working mode of FIG. 10D, in the third (n=3) discharging interval of the third (n=3) charging and discharging period, the first power switch Q1_SW$_1$ and the second power switch Q2_SW$_1$ of the power switch group SW$_1$, the first power switch Q1_SW$_2$ of the power switch group SW$_2$ and the second power switch Q2_SW$_3$ of the power switch group SW$_3$ are non-conducted, while the first power switch Q1_SW$_3$ of the power switch group SW$_3$ and the second power switch Q2_SW$_2$ of the power switch group SW$_2$ are conducted. As a result, the first power switch Q1_SW$_3$, the second power switch Q2_SW$_2$, and the energy storage element 131 form a loop (illustrated as a thick solid line), and the energy storage element 131 releases the discharging current $I_{L2}$ to supply power to the load 20 through such loop. In addition, in the discharging interval, the power supply 10 charges the capacitors $C_1$, $C_2$, and $C_3$ simultaneously.

In another embodiment, in the third (n=3) discharging interval of the third (n=3) charging and discharging period, the power switch module 120 could control the discharging of the power conversion module 130 by adopting the switching mode illustrated in FIG. 10B.

Figure 11:
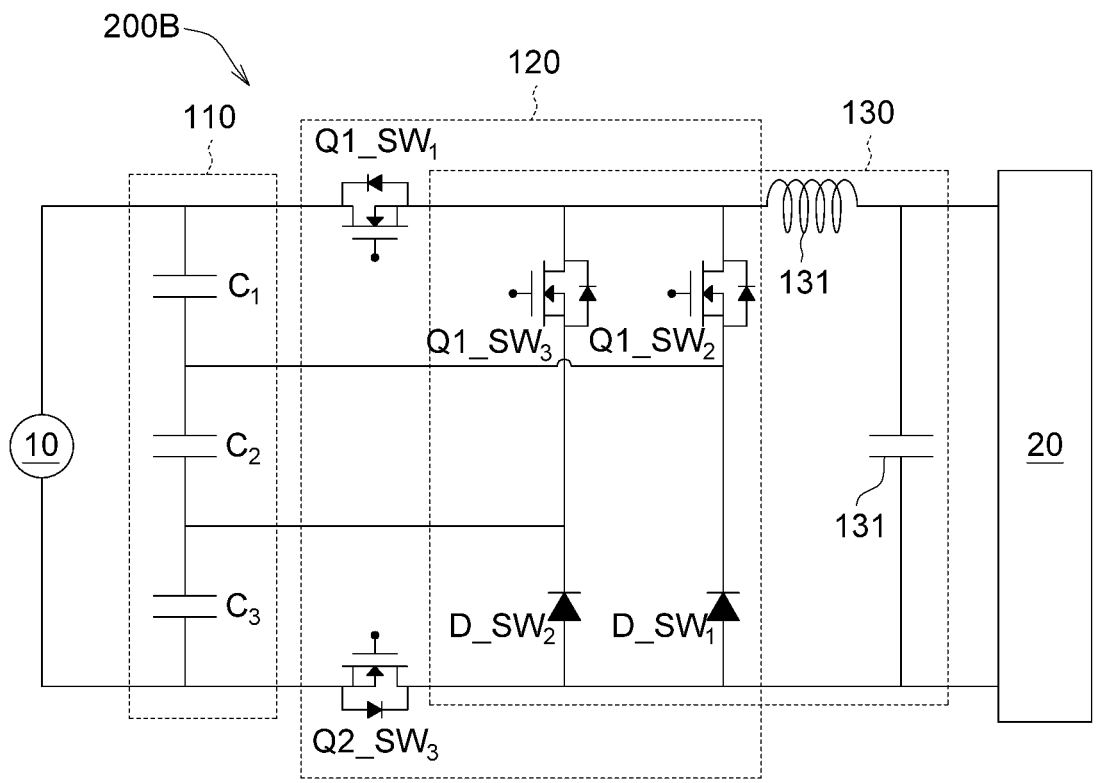
FIG. 11 is a schematic diagram of a circuit of a multi-stage buck converter 200B according to another embodiment of the present disclosure.

Referring to FIG. 11, FIG. 11 is a schematic diagram of a circuit of a multi-stage buck converter 200B according to another embodiment of the present disclosure.

The multi-stage buck converter 200B has the technical features same as or similar to that of the multi-stage buck converter 200A. It should be noted that the power switch module 120 of the multi-stage buck converter 200B includes at least one diode. For example, the power switch group SW$_1$ includes the first power switch Q1_SW$_1$ and the diode D_SW$_1$, and the power switch group SW$_2$ includes the first power switch Q1_SW$_2$ and the diode D_SW$_2$. In the present embodiment, compared to the multi-stage buck converter 200A, the second power switch Q2_SW$_1$ of the power switch group SW$_1$ of the multi-stage buck converter 200B is replaced with the diode D_SW$_1$, and the second power switch Q2_SW$_2$ of the power switch group SW$_2$ is replaced by a diode D_SW$_2$. In terms of control, it only needs to control one or some of the power switch of the power switch group SW$_n$ to be conducted or non-conducted, for achieving the technical effect of multi-frequency output. For example, it only needs to control the first power switch Q1_SW$_1$ of the power switch group SW$_1$ to be conducted or non-conducted and control the first power switch Q1_SW$_2$ of the power switch group SW$_2$ to be conducted or non-conducted for achieving the technical effect of multi-frequency output.

Figure 12:
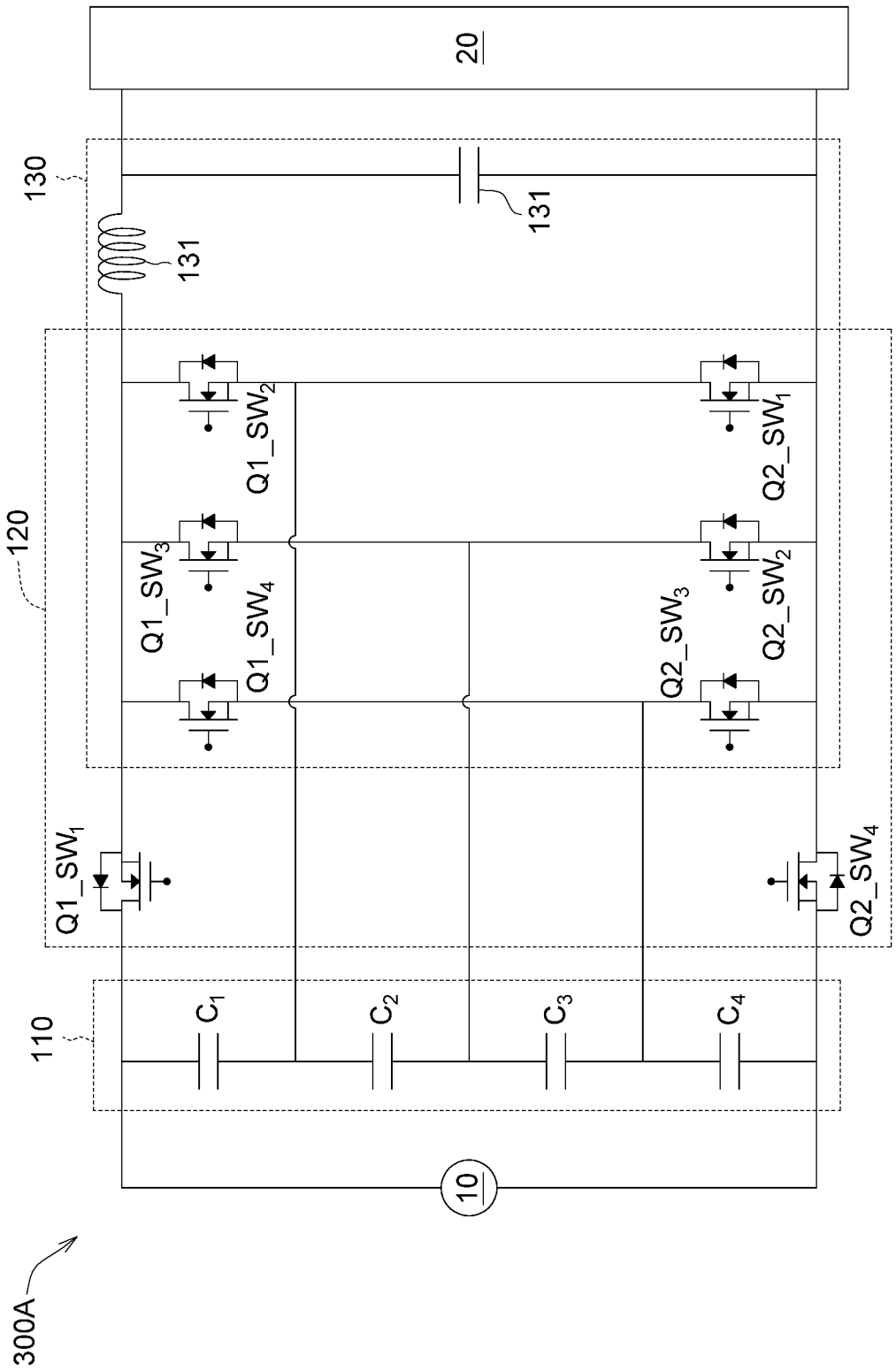
FIG. 12 is a schematic diagram of a circuit of a multi-stage buck converter 300A according to another embodiment of the present disclosure.

Referring to FIG. 12, FIG. 12 is a schematic diagram of a circuit of a multi-stage buck converter 300A according to another embodiment of the present disclosure.

The multi-stage buck converter 300A is a 4-stage (N=4) buck converter. The multi-stage buck converter 300A includes the capacitor string 110, the power switch module 120 and the power conversion module 130. The capacitor string 110 includes four (N=4) capacitors $C_1$ to $C_4$ connected in series. The power switch module 120 is coupled to the capacitor string 110 and includes four (N=4) power switch groups SW$_1$ to SW$_4$. The power conversion module 130 is coupled to the power switch module 120. The working frequency $f_W$ of the power conversion module 130 is equal to four times (N=4) of the switching frequency $f_S$ of the power switch group SW$_1$, SW$_2$, SW$_3$ or SW$_4$. As a result, similar to the aforementioned timing control method, in one switching period $T_S$ of the power switch group SW$_1$, SW$_2$, SW$_3$ or SW$_4$, the power conversion module 130 could perform the charging and discharging periods for four times (N=4) for achieving the technical effect of quadruple-frequency output.

In the present embodiment, the power switch module 120 and the power conversion module 130 share some components. For example, the power switch module 120 and the power conversion module 130 share at least one of the power switches Q2_SW$_1$, Q1_SW$_2$, Q2_SW$_2$, Q1_SW$_3$, Q2_SW$_3$, and Q1_SW$_4$. One or some of the shared power switches are conducted during the charging interval and the discharging interval.

Figure 13A:
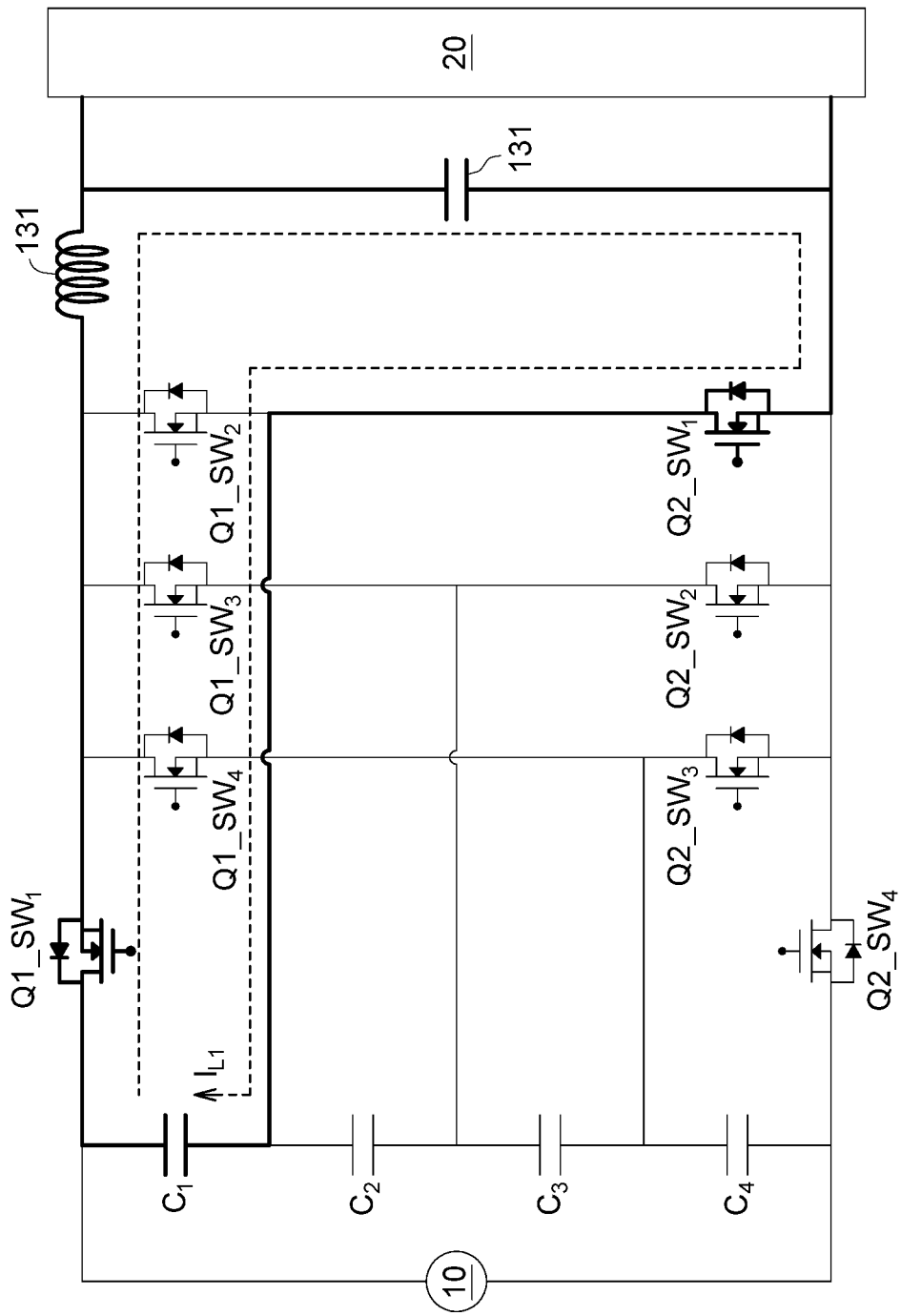
FIG. 13A is a schematic diagram of the power supply 10 of FIG. 12 charging the energy storage element 131 through the power switch group $SW_1$.
Figure 13B:
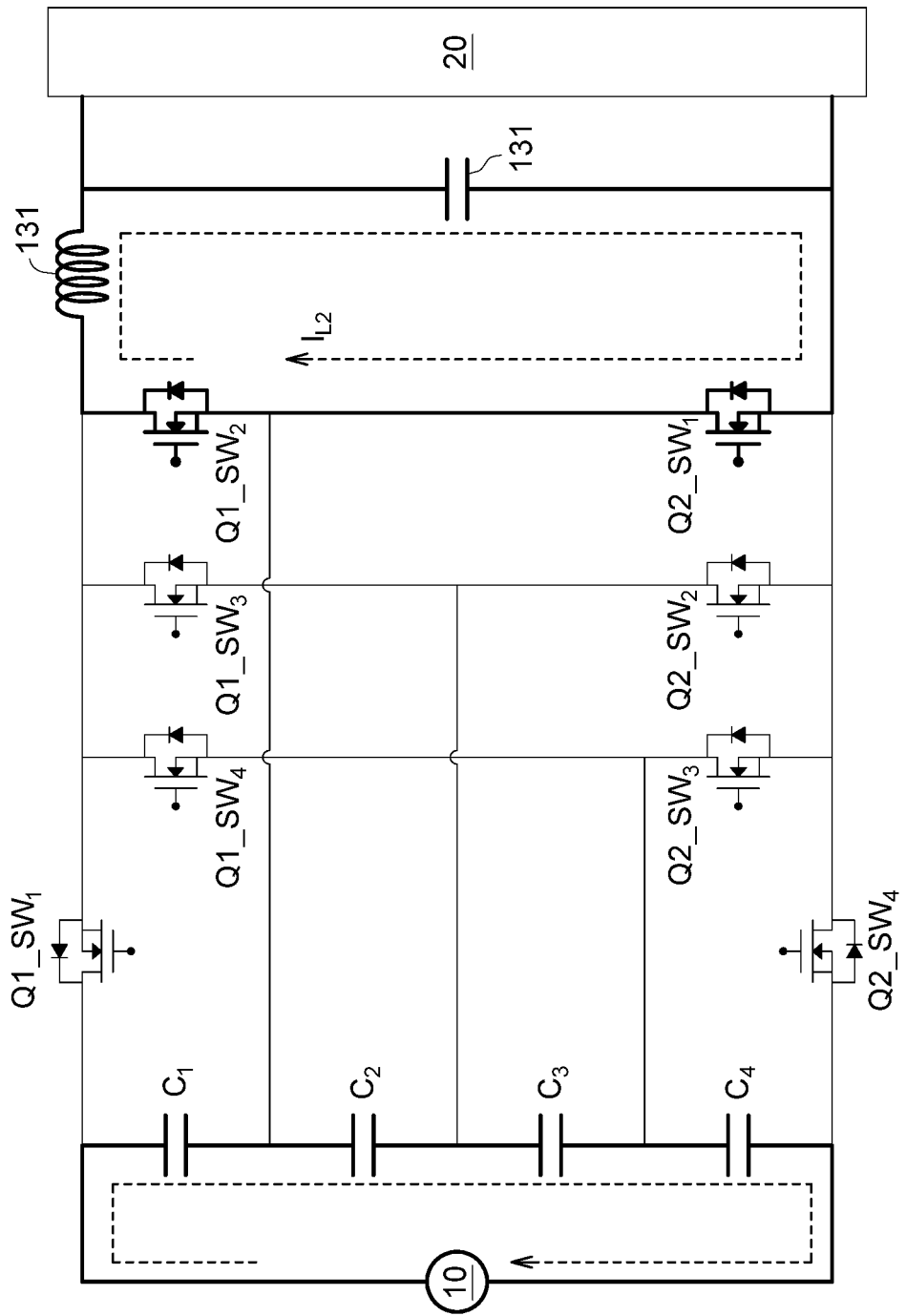
FIG. 13B is a schematic diagram of the energy storage element 131 of FIG. 13A discharging.
Figure 13C:
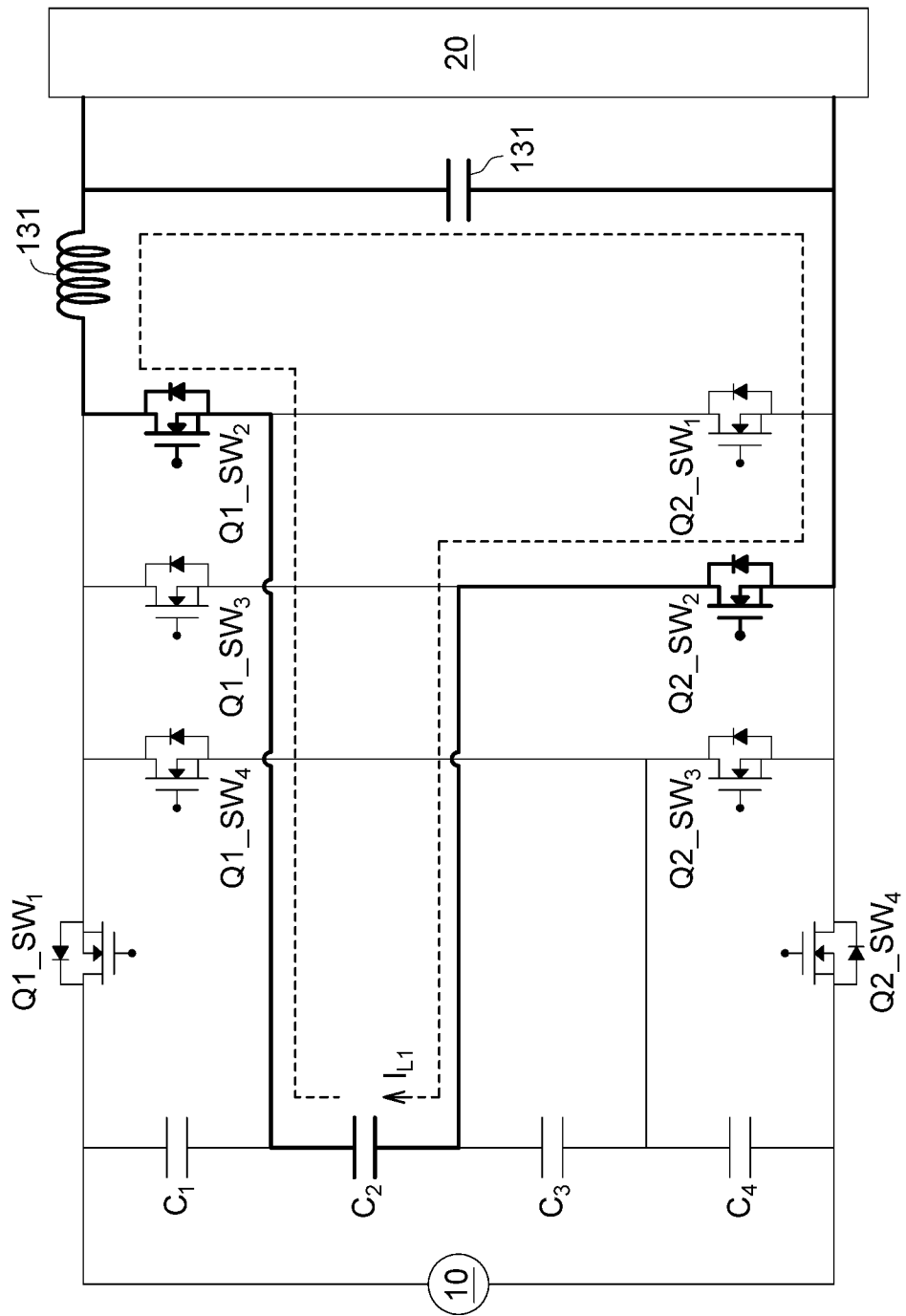
FIG. 13C is a schematic diagram of the power supply 10 of FIG. 12 charging the energy storage element 131 through the power switch group $SW_2$.
Figure 13D:
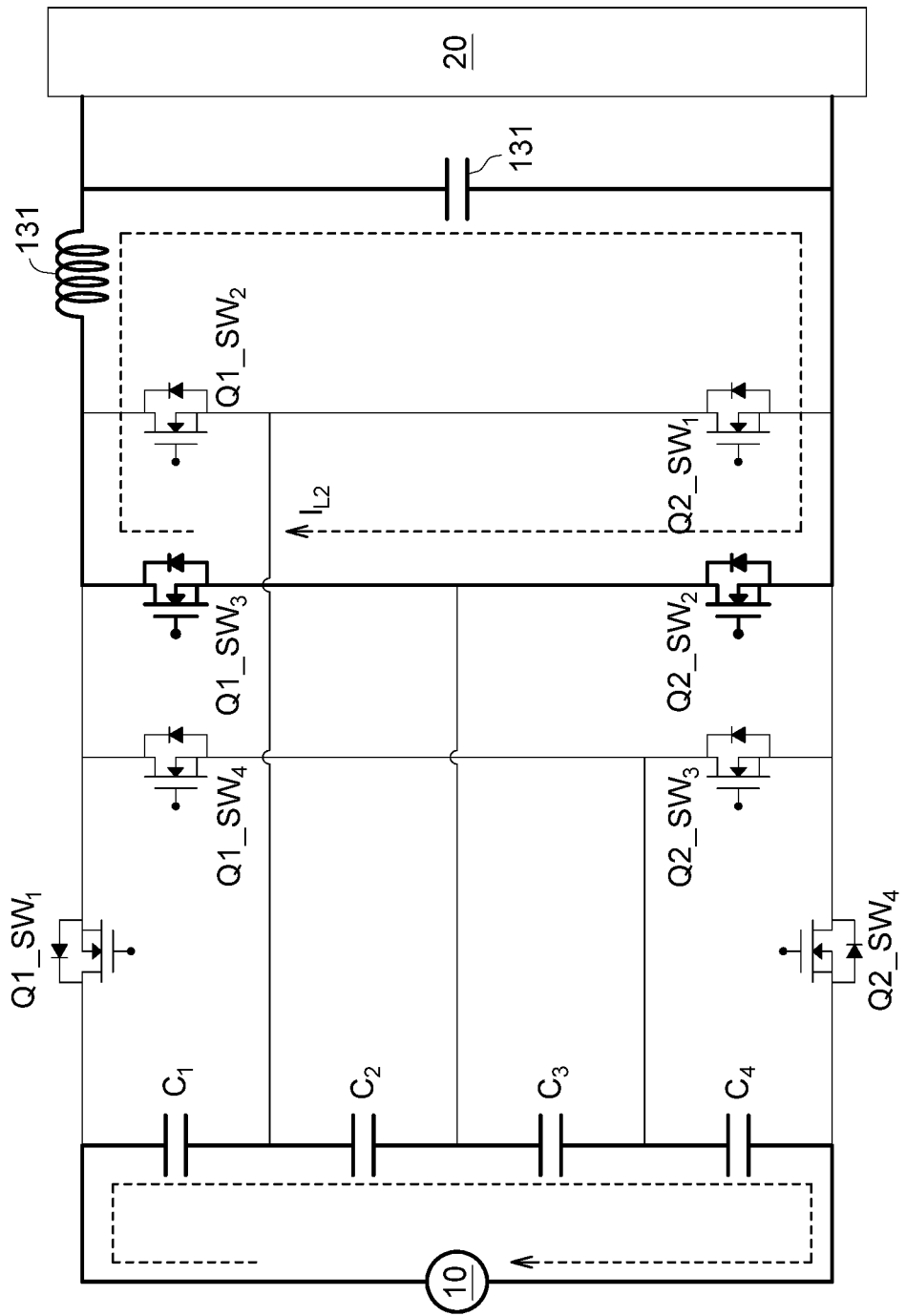
FIG. 13D is a schematic diagram of the energy storage element 131 of FIG. 13C discharging.
Figure 13E:
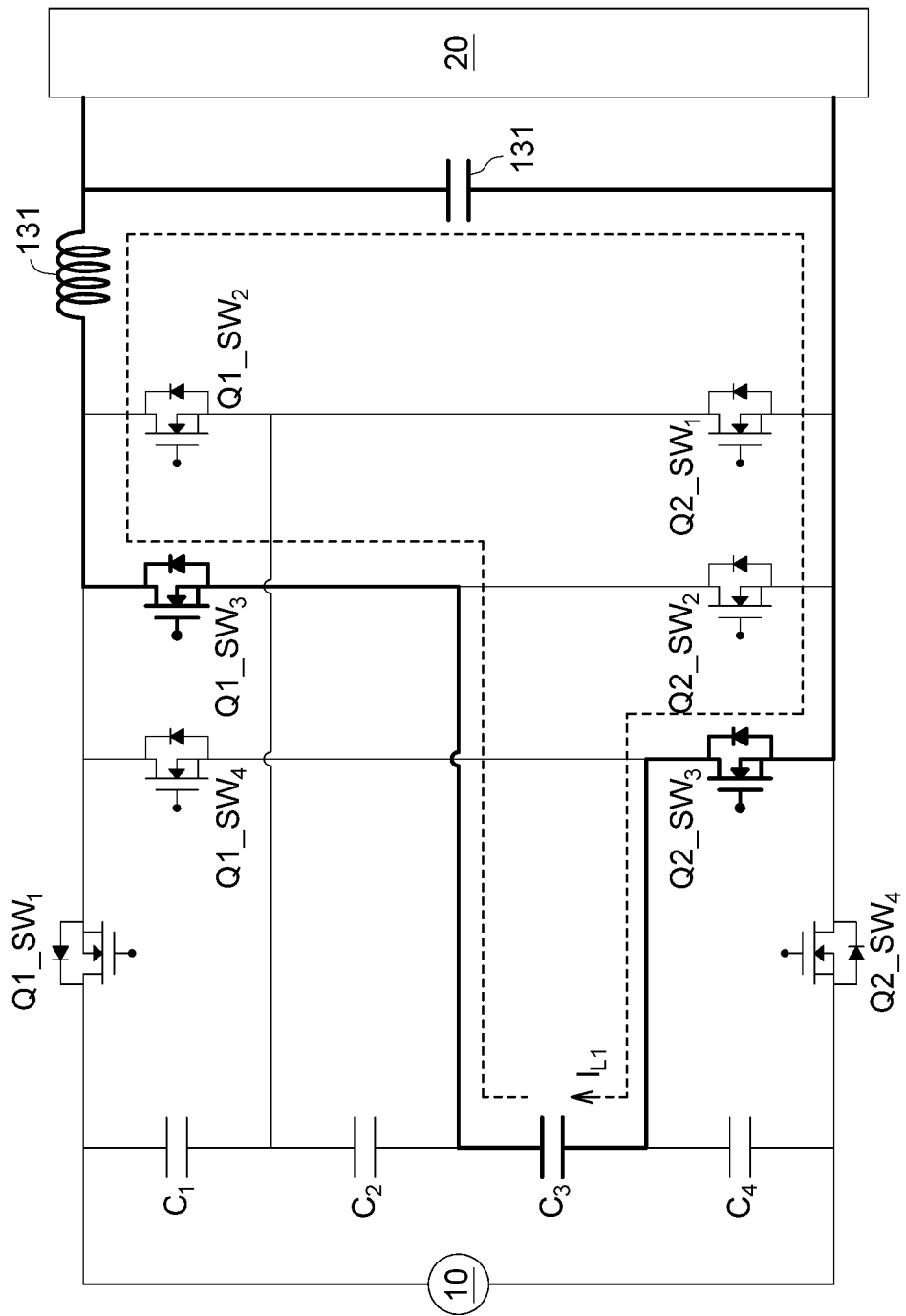
FIG. 13E is a schematic diagram of the power supply 10 of FIG. 12 charging the energy storage element 131 through the power switch group $SW_3$.
Figure 13F:
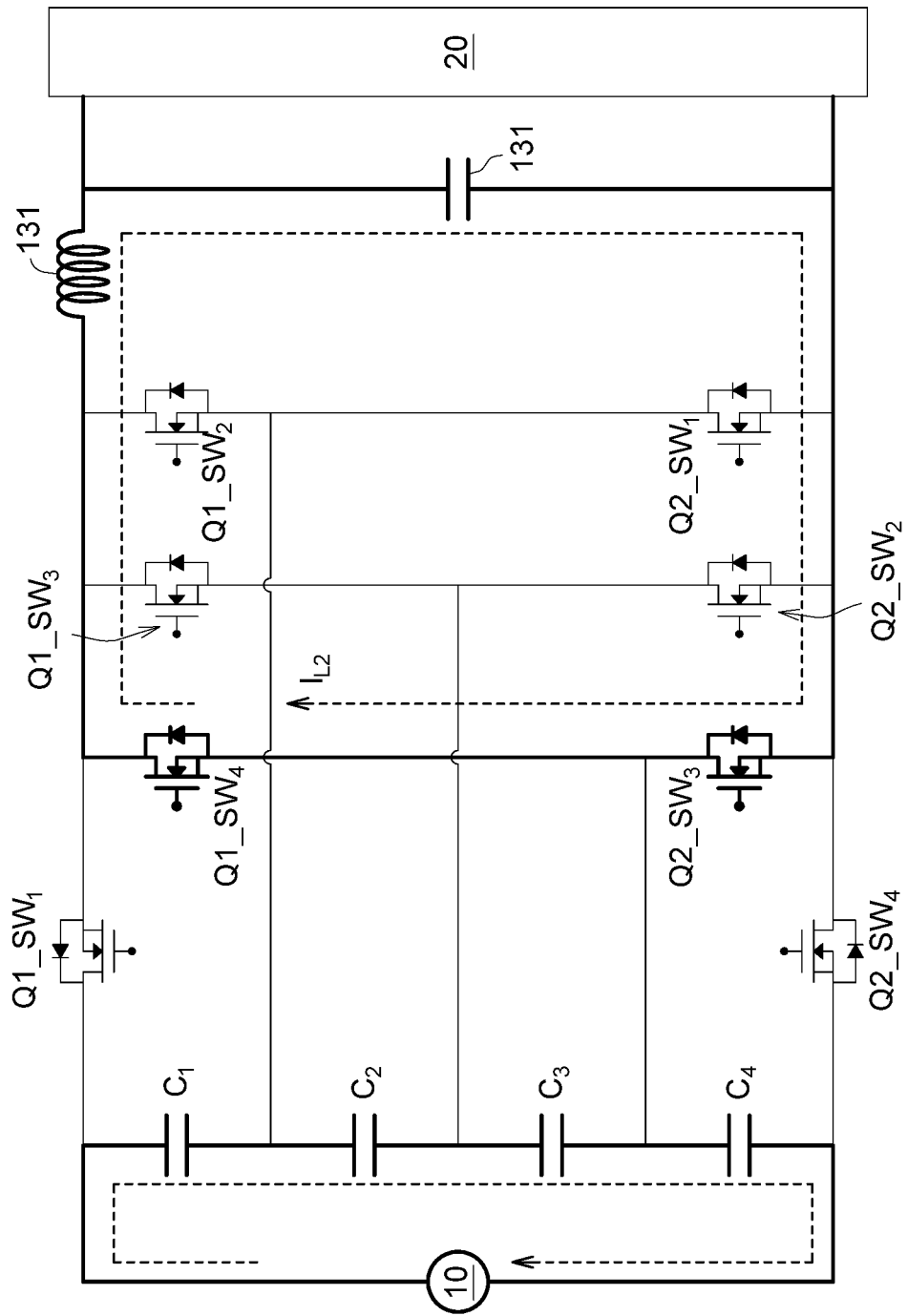
FIG. 13F is a schematic diagram of the energy storage element 131 of FIG. 13E discharging.
Figure 13G:
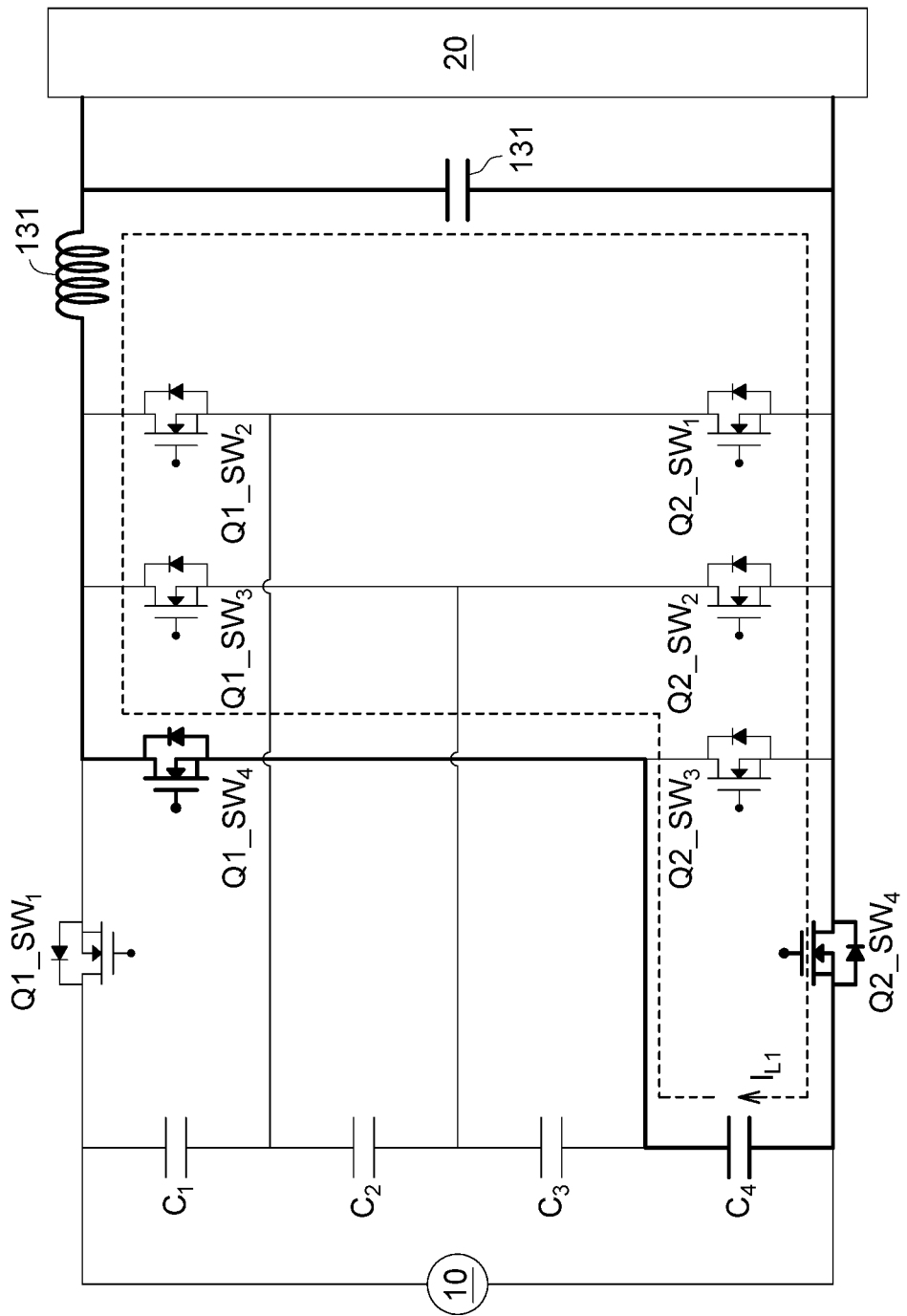
FIG. 13G is a schematic diagram of the power supply 10 of FIG. 12 charging the energy storage element 131 through the power switch group $SW_4$.

Referring to FIGS. 13A to 13G, FIG. 13A is a schematic diagram of the power supply 10 of FIG. 12 charging the energy storage element 131 through the power switch group SW$_1$, and FIG. 13B is a schematic diagram of the energy storage element 131 of FIG. 13A discharging, FIG. 13C is a schematic diagram of the power supply 10 of FIG. 12 charging the energy storage element 131 through the power switch group SW$_2$, FIG. 13D is a schematic diagram of the energy storage element 131 of FIG. 13C discharging, and FIG. 13E is a schematic diagram of the power supply 10 of FIG. 12 charging the energy storage element 131 through the power switch group SW$_3$, FIG. 13F is a schematic diagram of the energy storage element 131 of FIG. 13E discharging, and FIG. 13G is a schematic diagram of the power supply 10 of FIG. 12 charging the energy storage element 131 through the power switch group SW$_4$.

The timing control principle of the multi-stage buck converter 300A is similar to the timing control principle of FIG. 5, and will not be repeated here.

As illustrated in FIG. 13A, in the first (n=1) charging interval of the first (n=1) charging and discharging period, the first power switch Q1_SW$_1$ and the second power switch Q2_SW$_1$ of the power switch group SW$_1$ are conducted simultaneously, while the first power switch Q1_SW$_2$ and the second power switch Q2_SW$_2$ of the power switch group SW$_2$, the first power switch Q1_SW$_3$ and the second power switch Q2_SW$_3$ of the power switch group SW$_3$ and the first power switch Q1_SW$_4$ and the second power switch Q2_SW$_4$ of the power switch group SW$_4$ are non-conducted. As a result, the capacitor C$_1$, the power switch group SW$_1$, and the energy storage element 131 form a loop (illustrated as a thick solid line), and the charging current I$_{L1}$ charges the energy storage element 131 through such loop.

As illustrated in FIG. 13B, in the first (n=1) discharging interval of the first (n=1) charging and discharging period, the first power switch Q1_SW$_1$ of the power switch group SW$_1$, the second power switch Q2_SW$_2$ of the power switch group SW$_2$, the first power switch Q1_SW$_3$ and the second power switch Q2_SW$_3$ of the power switch group SW$_3$, and the first power switch Q1_SW$_4$ and the second power switch Q2_SW$_4$ of the power switch group SW$_4$ are non-conducted, while the second power switch Q2_SW$_1$ of the power switch group SW$_1$ and the first power switch Q1_SW$_2$ of the power switch group SW$_2$ are conducted. As a result, the second power switch Q2_SW$_1$, the first power switch Q1_SW$_2$ and the energy storage element 131 form a loop (illustrated as a thick solid line), and the energy storage element 131 releases the discharging current I$_{L2}$ to supply power to the load 20 through such loop. In addition, in the discharging interval, the power supply 10 charges the capacitors C$_1$, C$_2$, C$_3$, and C$_4$ simultaneously.

In another embodiment, in the first (n=1) discharging interval of the first (n=1) charging and discharging period, the power switch module 120 could control the discharging of the power conversion module 130 by adopting the switching mode illustrated in FIG. 13D or FIG. 13F.

As illustrated in FIG. 13C, in the second (n=2) charging interval of the second (n=2) charging and discharging period, the first power switch Q1_SW$_2$ and the second power switch Q2_SW$_2$ of the power switch group SW$_2$ are conducted simultaneously, and the first power switch Q1_SW$_1$ and the second power switch Q2_SW$_1$ of the power switch group SW$_1$, the first power switch Q1_SW$_3$ and the second power switch Q2_SW$_3$ of the power switch group SW$_3$, the first power switch Q1_SW$_4$ and the second power switch Q2_SW$_4$ of the power switch group SW$_4$ are non-conducted. As a result, the capacitor C$_2$, the power switch group SW$_2$ and the energy storage element 131 form a loop (illustrated as a thick solid line), and the charging current I$_{L1}$ charges the energy storage element 131 through such loop.

As illustrated in FIG. 13D, in the second (n=2) discharging interval of the second (n=2) charging and discharging period, the first power switch Q1_SW$_1$ and the second power switch Q2_SW$_1$ of the power switch group SW$_1$, the first power switch Q1_SW$_2$ of the power switch group SW$_2$, the second power switch Q2_SW$_3$ of the power switch group SW$_3$, the first power switch Q1_SW$_4$ and the second power switch Q2_SW$_4$ of the power switch group SW$_4$ are non-conducted, while the second power switch Q2_SW$_2$ of the power switch group SW$_2$ and the first power switch Q1_SW$_3$ of the power switch group SW$_3$ are conducted. As a result, the second power switch Q2_SW$_2$, the first power switch Q1_SW$_3$ and the energy storage element 131 form a loop (illustrated as a thick solid line), and the energy storage element 131 releases the discharging current I$_{L2}$ to supply power to the load 20 through such loop. In addition, in the discharging interval, the power supply 10 charges the capacitors C$_1$, C$_2$, C$_3$, and C$_4$ simultaneously.

In another embodiment, in the second (n=2) discharging interval of the second (n=2) charging and discharging period, the power switch module 120 could control the discharging of the power conversion module 130 by adopting the switching mode illustrated in FIG. 13B or FIG. 13F.

As illustrated in FIG. 13E, in the third (n=3) charging interval of the third (n=3) charging and discharging period, the first power switch Q1_SW$_3$ and the second power switch Q2_SW$_3$ of the power switch group SW$_3$ are conducted simultaneously, while the first power switch Q1_SW$_1$ and the second power switch Q2_SW$_1$ of the power switch group SW$_1$, the first power switch Q1_SW$_2$ and the second power switch Q2_SW$_2$ of the power switch group SW$_2$, the first power switch Q1_SW$_4$ and the second power switch Q2_SW$_4$ of the power switch group SW$_4$ are non-conducted. As a result, the capacitor C$_3$, the power switch group SW$_3$ and the energy storage element 131 form a loop (illustrated as a thick solid line), and the charging current I$_{L1}$ charges the energy storage element 131 through such loop.

As illustrated in FIG. 13F, in the third (n=3) discharging interval of the third (n=3) charging and discharging period, the first power switch Q1_SW$_1$ and the second power switch Q2_SW$_1$ of the power switch group SW1, the first power switch Q1_SW$_2$ and the second power switch Q2_SW$_2$ of the power group SW$_2$, the first power switch Q1_SW$_3$ of the power switch group SW$_3$ and the second power switch Q2_SW$_4$ of the power switch group SW$_4$ are non-conducted, while the second power switch Q2_SW$_3$ of the power switch group SW$_3$ and the first power switch Q1_SW$_4$ of the power switch group SW$_4$ are conducted. As a result, the second power switch Q2_SW$_3$, the first power switch Q1_SW$_4$ and the energy storage element 131 form a loop (illustrated as a thick solid line), and the energy storage element 131 releases the discharging current I$_{L2}$ to supply power to the load 20 through such loop. In addition, in the discharging interval, the power supply 10 charges the capacitors C$_1$, C$_2$, C$_3$, and C$_4$ simultaneously.

In another embodiment, in the third (n=3) discharging interval of the third (n=3) charging and discharging period, the power switch module 120 could control the discharging of the power conversion module 130 by adopting the switching mode illustrated in FIG. 13B or FIG. 13D.

As illustrated in FIG. 13G, in the fourth (n=4) charging interval of the fourth (n=4) charging and discharging period, the first power switch Q1_SW$_4$ and the second power switch Q2_SW$_4$ of the power switch group SW$_4$ are conducted simultaneously, while the first power switch Q1_SW$_1$ and the second power switch Q2_SW$_1$ of the power switch group SW$_1$, the first power switch Q1_SW$_2$ and the second power switch Q2_SW$_2$ of the power switch group SW$_2$, the first power switch Q1_SW$_3$ and the second power switch Q2_SW$_3$ of the power switch group SW$_3$ are non-conducted. As a result, the capacitor C$_4$, the power switch group SW$_4$ and the energy storage element 131 form a loop (illustrated as a thick solid line), and the charging current I$_{L1}$ charges the energy storage element 131 through such loop.

Similar to the working mode of FIG. 13F, in the fourth (n=4) discharging interval of the fourth (n=4) charging and discharging period, the first power switch Q1_SW$_1$ and the second power switch Q2_SW$_1$ of the power switch group SW1, the first power switch Q1_SW$_2$ and the second power switch Q2_SW$_2$ of the power switch group SW$_2$, the first power switch Q1_SW$_3$ of the power switch group SW$_3$, the second power switch Q2_SW$_4$ of the power switch group SW$_4$ are non-conducted, while the second power switch Q2_SW$_3$ of the power switch group SW$_3$ and the first power switch Q1_SW$_4$ of the power switch group SW$_4$ are conducted. As a result, the second power switch Q2_SW$_3$, the first power switch Q1_SW$_4$ and the energy storage element 131 form a loop, and the energy storage element 131 releases the discharging current $I_{L2}$ to supply power to the load 20 through such loop.

In another embodiment, in the fourth (n=4) discharging interval of the fourth (n=4) charging and discharging period, the power switch module 120 could control the discharging of the power conversion module 130 by adopting the switching mode illustrated in FIG. 13B or FIG. 13D.

Figure 14:
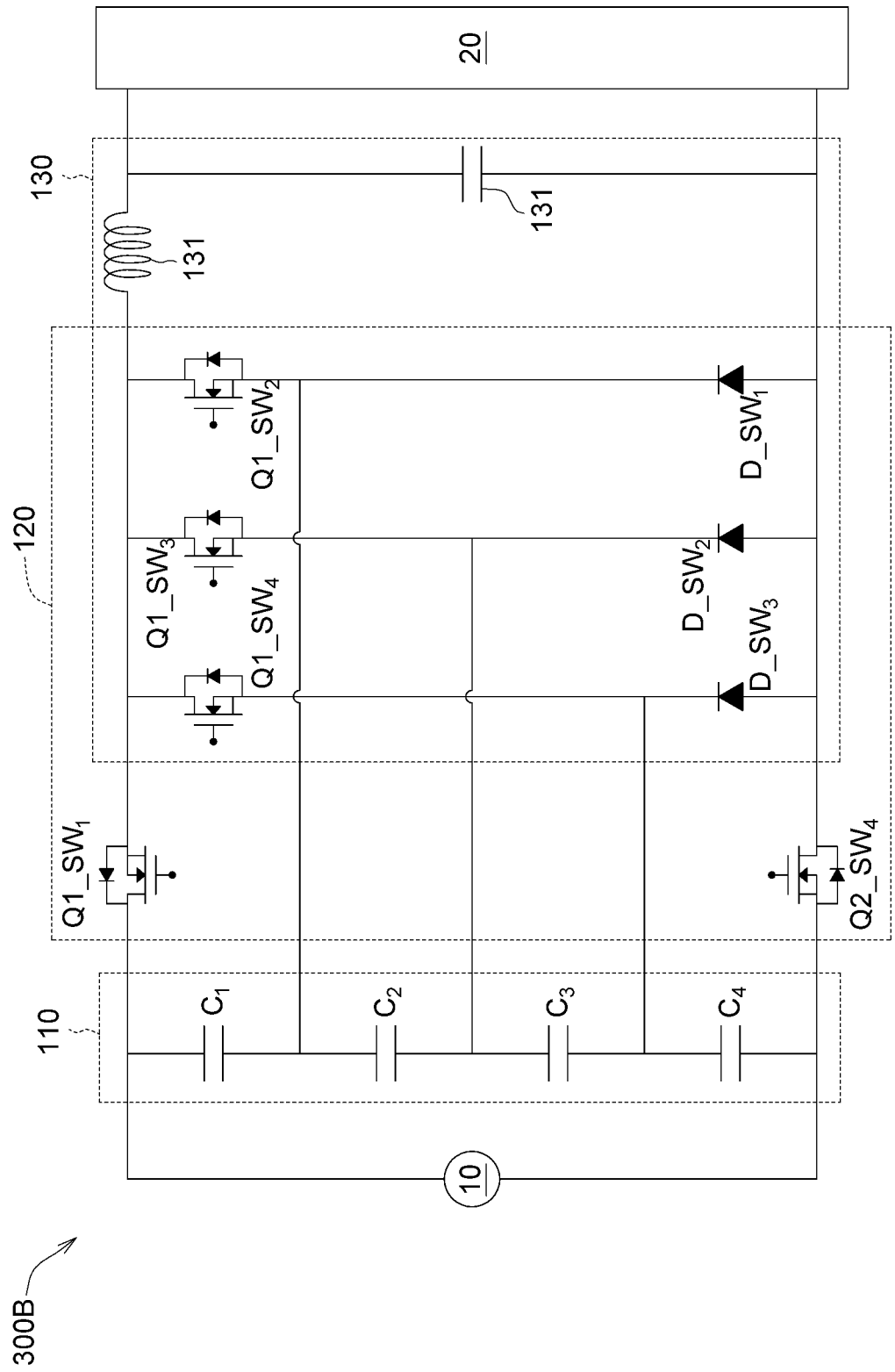
FIG. 14 is a schematic diagram of a circuit of a multi-stage buck converter 300B according to another embodiment of the present disclosure.

Referring to FIG. 14, FIG. 14 is a schematic diagram of a circuit of a multi-stage buck converter 300B according to another embodiment of the present disclosure.

The multi-stage buck converter 300B has the technical features same as or similar to that of the multi-stage buck converter 300A. It should be noted that the power switch module 120 of the multi-stage buck converter 300B includes at least one diode. For example, the power switch group $SW_1$ includes the first power switch $Q1\_SW_1$ and the diode $D\_SW_1$, the power switch group $SW_2$ includes the first power switch $Q1\_SW_2$ and the diode $D\_SW_2$, and the power switch group $SW_3$ includes the first power switch $Q1\_SW_3$ and the diode $D\_SW_3$. In the present embodiment, compared to the multi-stage buck converter 300A, the second power switch $Q2\_SW_1$ of the power switch group $SW_1$ of the multi-stage buck converter 300B is replaced by the diode $D\_SW_1$, and the second power switch $Q2\_SW_2$ of the power switch group $SW_2$ is replaced by the diode $D\_SW_2$, and the second power switch $Q2\_SW_3$ of the power switch group $SW_3$ is replaced by the diode $D\_SW_3$. In terms of control, it only needs to control one or some of the power switch of the power switch group $SW_n$ of the multi-stage buck converter 300B to be conducted or non-conducted for achieving the technical effect of multi-frequency output. For example, it only needs to control the first power switch $Q1\_SW_1$ of the power switch group $SW_1$ to be conducted or non-conducted, control the first power switch $Q1\_SW_2$ of the power switch group $SW_2$ to be conducted or non-conducted, and control the first power switch $Q1\_SW_3$ of the power switch group $SW_3$ to be conducted or non-conducted for achieving the technical effect of multi-frequency output.

Although the foregoing embodiments are taking 2-stage (N=2), 3-stage (N=3), and 4-stage (N=4) buck converters for examples, according to the foregoing principles, the multi-stage buck converter of the embodiment of the present disclosure could be expand to 5-stage and more, the following describes further examples.

Referring to FIGS. 15A to 15D, FIGS. 15A to 15D are schematic diagrams of single-stage buck converter being an expanded to an N-stage buck converter according to another embodiment of the present disclosure.

Figure 15A:
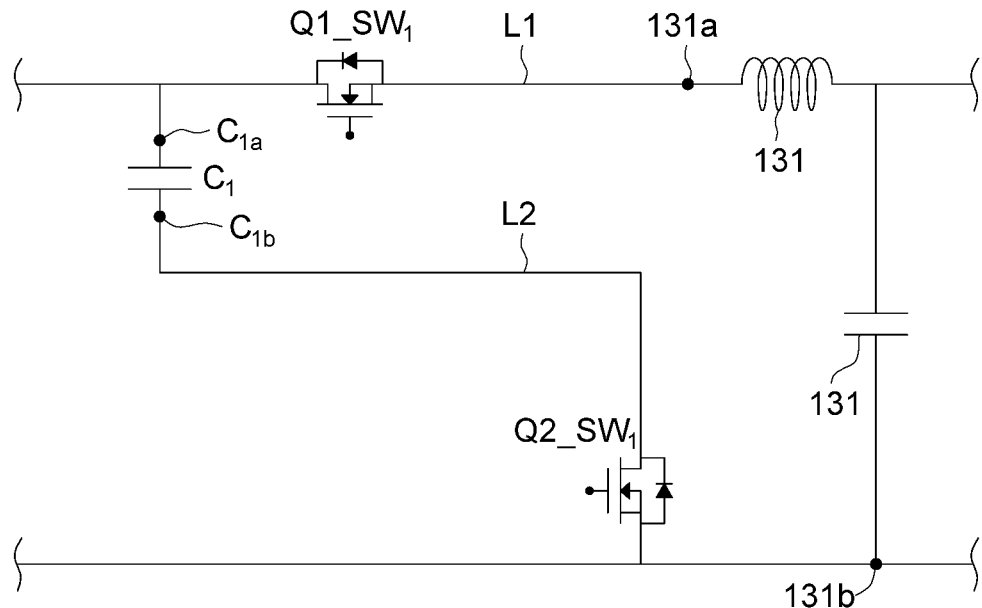
FIGS. 15A to 15D are schematic diagrams of single-stage buck converter being an expanded to an N-stage buck converter according to another embodiment of the present disclosure.

As illustrated in FIG. 15A, the first power switch $Q1\_SW_1$ of the power switch group $SW_1$ is coupled to the first terminal $C_{1a}$ of the capacitor $C_1$ and the first terminal 131a of the energy storage element 131, and the second power switch $Q2\_SW_1$ of the power switch group $SW_1$ is coupled to the second terminal $C_{1b}$ of the capacitor $C_1$ and the second terminal 131b of the energy storage element 131.

Figure 15B:
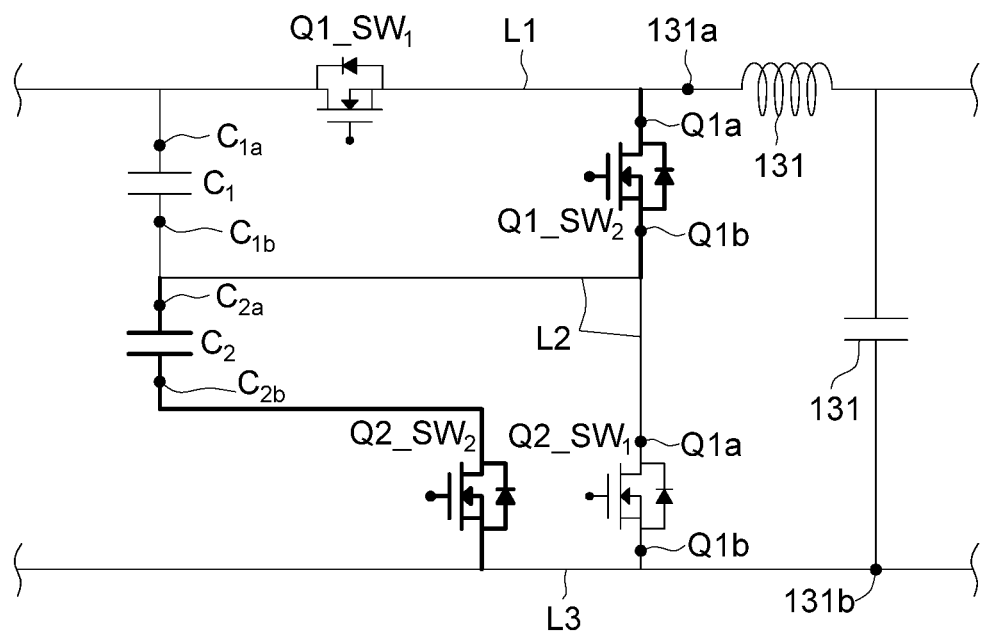

As illustrated in FIG. 15B, for the 2-stage (N=2) buck converter, the first terminal $C_{2a}$ of the capacitor $C_2$ is coupled to the second terminal $C_{1b}$ of the capacitor $C_1$, and the first terminal Q1a of the power switch $Q1\_SW_2$ of the power switch group $SW_2$ is coupled to a trace L1 between the first power switch $Q1\_SW_1$ and the first terminal 131a of the energy storage element 131 (the trace L1 is also illustrated in FIG. 15A), and the second terminal Q1b of the first power switch $Q1\_SW_2$ is coupled to a trace L2 between the second terminal $C_{1b}$ of the capacitor $C_1$ and the second power switch $Q2\_SW_1$ (the trace L2 is also illustrated in FIG. 15A), and the second power switch $Q2\_SW_2$ of the power switch group $SW_2$ is connected to a trace L3 between the second terminal $C_{2b}$ of the capacitor $C_2$ and the second terminal 131b of the energy storage element 131 in series.

In addition, as illustrated in FIG. 15B, the first terminal Q1a of the power switch of the second power switch group $SW_2$ (for example, the first power switch $Q1\_SW_2$) is coupled to the first terminal 131a of the power conversion module (for example, the energy storage element 131), the second terminal Q1b of the power switch (for example, the first power switch $Q1\_SW_2$) of the second power switch group $SW_2$ is coupled to the first terminal Q1a of the power switch (for example, the second power switch $Q2\_SW_1$) of the first power switch group $SW_1$, the second terminal Q1b of the power switch (for example, the second power switch $Q2\_SW_1$) of the first power switch group $SW_1$ is coupled to the second terminal 131b of the power conversion module (for example, the energy storage element 131). As a result, when the first power switch $Q1\_SW_2$ of the second power switch group $SW_2$ and the second power switch $Q2\_SW_1$ of the first power switch group $SW_1$ are conducted, the first power switch $Q1\_SW_2$, the second power switch $Q2\_SW_1$ and the energy storage element 131 could form a loop supplying power to the load 20.

Figure 15C:
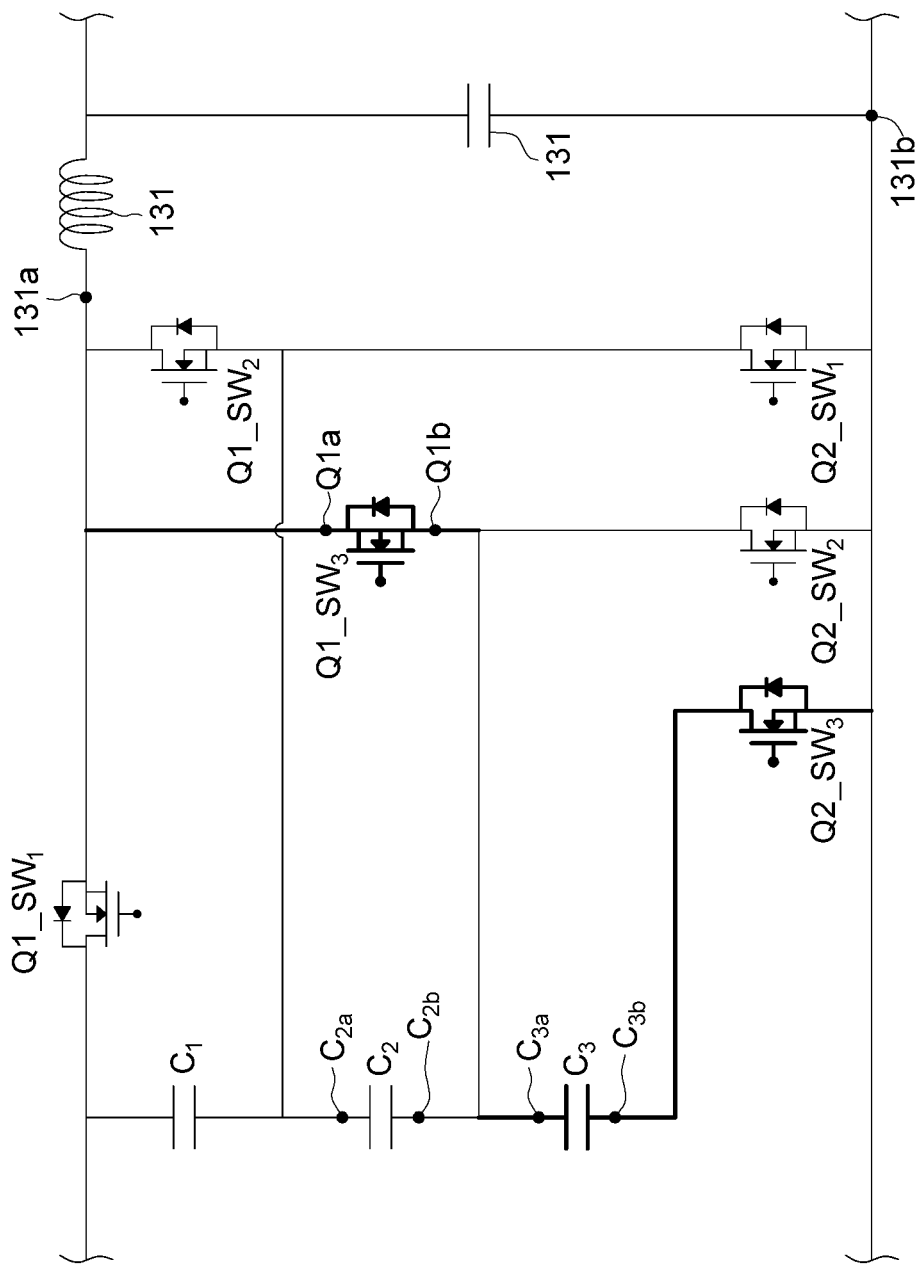

As illustrated in FIG. 15C, for the 3-stage (N=3) buck converter, the first terminal $C_{3a}$ of the capacitor $C_3$ is coupled to the second terminal $C_{2b}$ of the capacitor $C_2$, and the first terminal Q1a of a power switch $Q1\_SW_3$ of the power switch group $SW_3$ is coupled to the trace L1 between the first power switch $Q1\_SW_1$ and the first terminal 131a of the energy storage element 131, and the second terminal Q1b of the first power switch $Q1\_SW_3$ is coupled to the trace L2 between the second terminal $C_{2b}$ of the capacitor $C_2$ and the second power switch $Q2\_SW_2$, and the second power switch $Q2\_SW_3$ of the power switch group $SW_3$ is coupled to the trace L3 between the second terminal $C_{ab}$ of the capacitor $C_3$ and the second terminal 131b of the energy storage element 131. In addition, the first terminal Q1a of the power switch (for example, the first power switch $Q1\_SW_3$) of the third power switch group $SW_3$ is coupled to the first terminal 131a of the power conversion module (for example, the energy storage element 131), and the second terminal Q1b of the power switch (for example, the first power switch $Q1\_SW_3$) of the third power switch group $SW_3$ is coupled to the first terminal Q1a of the power switch (for example, the second power switch $Q2\_SW_2$) of the second power switch group $SW_2$, The second terminal Q1b of the power switch (for example, the second power switch $Q2\_SW_2$) of the second power switch group $SW_2$ is coupled to the second terminal 131b of the power conversion module (for example, the energy storage element 131). As a result, when the first power switch $Q1\_SW_3$ of the third power switch group $SW_3$ and the second power switch $Q2\_SW_2$ of the second power switch group $SW_2$ are conducted, the first power switch $Q1\_SW_3$, the second power switch $Q2\_SW_2$ and the energy storage element 131 could form a loop to supply power to the load 20.

Figure 15D:
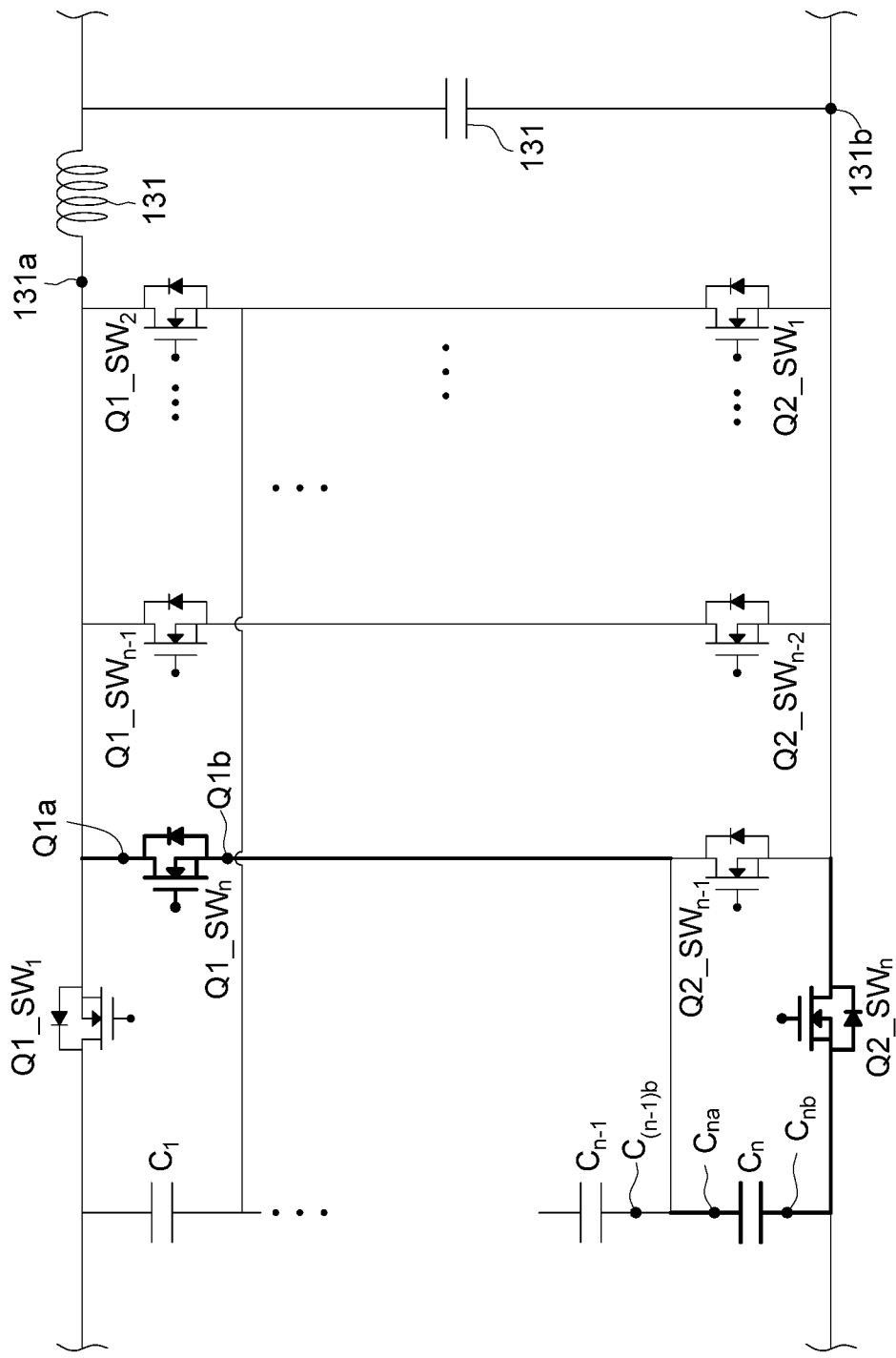

As illustrated in FIG. 15D, according to this principle, for an N-stage buck converter, the first terminal $C_{na}$ of the capacitor $C_n$ is coupled to the second terminal $C_{(n-1)b}$ of the capacitor $C_{(n-1)}$, the first terminal Q1a of the first power switch $Q1\_SW_n$ of the power switch group $SW_n$ is coupled to the trace L1 between the first power switch $Q1\_SW_1$ and the first terminal 131a of the energy storage element 131, the second terminal Q1b of the first power switch $Q1\_SW_n$ is coupled to the trace Ln between the second terminal $C_{(n-1)b}$ of the capacitor $C_{(n-1)}$ and the second power switch $Q2\_$ SW$_{(n-1)}$, and the second power switch Q2_SW$_n$ of the power switch group SW$_n$ is coupled to the trace L3 between the second terminal C$_{nb}$ of the capacitor C$_n$ and the second terminal 131$b$ of the energy storage element 131. In addition, the first terminal Q1$a$ of the power switch (for example, the first power switch Q1_SW$_n$) of the n$^{th}$ power switch group SW$_n$ is coupled to the first terminal 131$a$ of the power conversion module (for example, the energy storage element 131), the second terminal Q1$b$ of the power switch (for example, the first power switch Q1_SW$_n$) of the n$^{th}$ power switch group SW$_n$ is coupled to the first terminal Q1$a$ of the power switch (for example, the second power switch Q2_SW$_{(n-1)}$) of the (n–1)$^{th}$ power switch group SW$_{(n-1)}$, the second terminal Q1$b$ of the power switch (for example, the second power switch Q2_SW$_{(n-1)}$) of the (n–1)$^{th}$ power switch group SW$_{(n-1)}$ is coupled to the second terminal 131$b$ of the power conversion module (for example, the energy storage element 131). As a result, when the first power switch Q1_SW$_n$ of the n$^{th}$ power switch group SW$_n$ and the second power switch Q2_SW$_{(n-1)}$ of the (n–1)$^{th}$ power switch group SW$_{(n-1)}$ are conducted, the power switch Q1_SW$_n$ and the power switch Q2_SW$_{(n-1)}$ and the energy storage element 131 could form a loop to supply power to the load 20.

Figure 16:
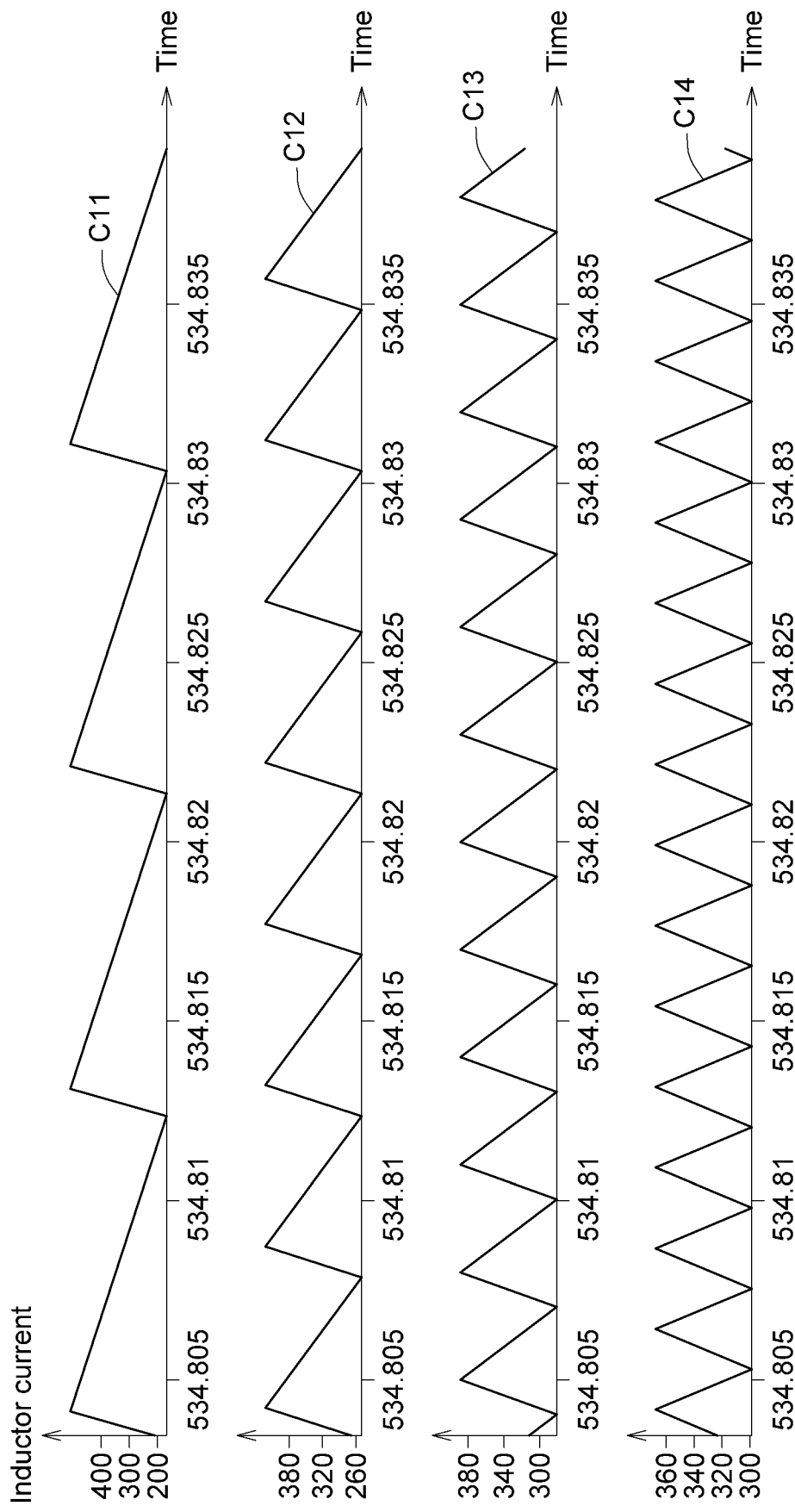
FIG. 16 is a schematic diagram of a simulation output curve of an inductor current of the multi-stage buck converter according to the embodiment of the present disclosure.
Figure 17:
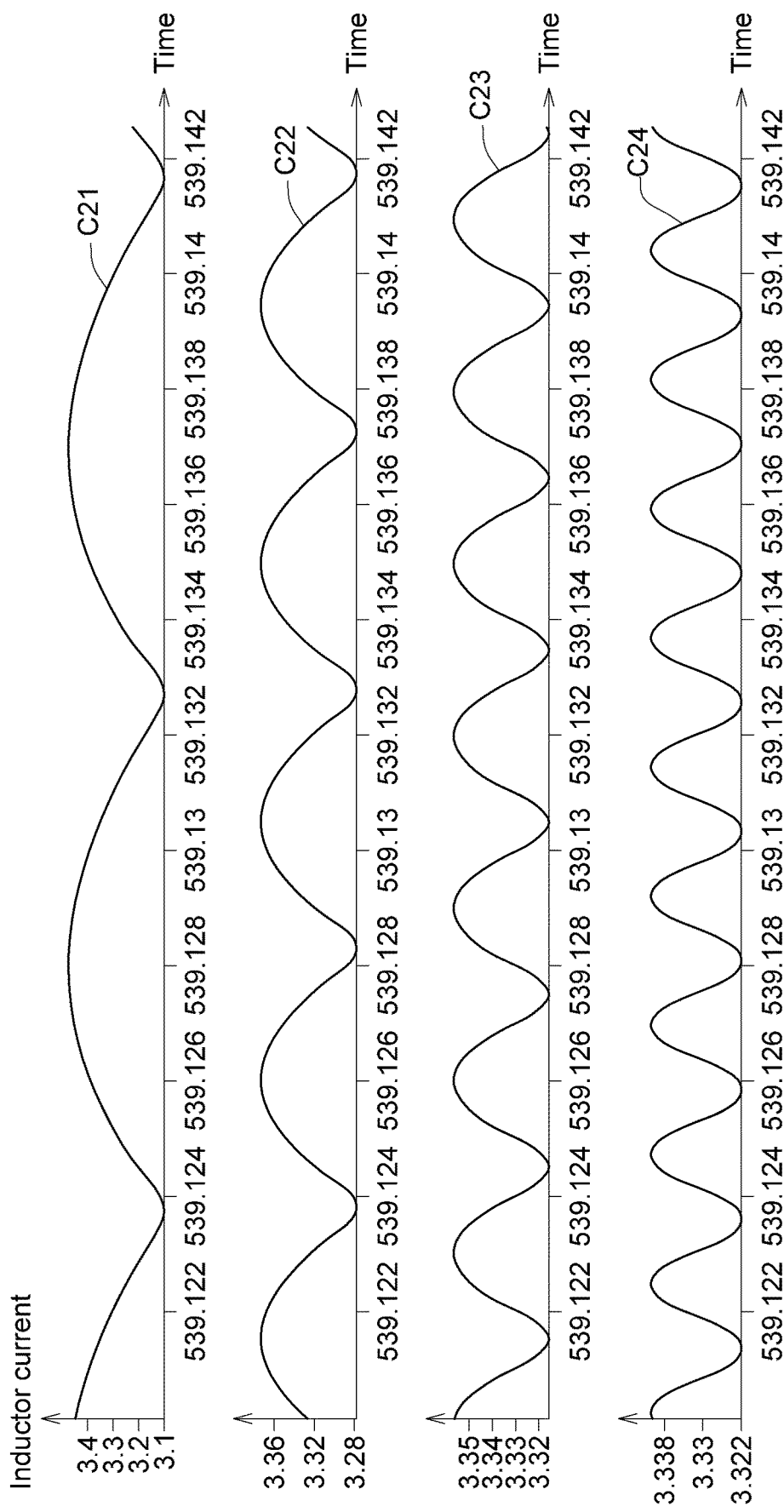
FIG. 17 is a schematic diagram of a simulation output curve of a capacitor voltage of the multi-stage buck converter according to the embodiment of the present disclosure.

Referring to FIGS. 16 and 17. FIG. 16 is a schematic diagram of a simulation output curve of an inductor current of the multi-stage buck converter according to the embodiment of the present disclosure, and FIG. 17 is a schematic diagram of a simulation output curve of a capacitor voltage of the multi-stage buck converter according to the embodiment of the present disclosure.

As illustrated in FIG. 16, the curve C11 represents an output curve of the inductor (energy storage element) current of a single-stage (N=1) buck converter, and the curve C12 represents an output curve of the inductor current of a 2-stage (N=2) buck converter, the curve C13 represents an output curve of the inductor current of a 3-stage (N=3) buck converter, and the curve C14 represents an output curve of the inductor current of a 4-stage (N=4) buck converter. In the case of the switching frequency fs of 111 kHz, the working frequency of the inductor current of the 2-stage buck converter is twice of that of the single-stage buck converter, and the working frequency of the inductor current of the 3-stage buck converter is three times of that of the single-stage buck converter, and the working frequency of the inductor current of the 4-stage buck converter is four times of that of the single-stage buck converter.

It could be seen from the trend change in FIG. 16, the more the number of the stage (the higher the value of N) is, the higher the working frequency of the inductor current is and the smaller the output current ripple is. The smaller the current ripple is, the smaller the inductor could be selected to use, and the higher the generated power density is.

As illustrated in FIG. 17, the curve C21 represents an output curve of the capacitor (energy storage element) voltage of the single-stage (N=1) buck converter, the curve C22 represents an output curve of the capacitor voltage of the 2-stage (N=2) buck converter, the curve C23 represents an output curve of the capacitor voltage of a 3-stage (N=3) buck converter, and the curve C24 represents an output curve of the capacitor voltage of a 4-stage (N=4) buck converter. In the case of the switching frequency fs of 111 kHz, the working frequency of the capacitor voltage of the 2-stage buck converter is twice of that of the single-stage buck converter, the working frequency of the capacitor voltage of the 3-stage buck converter is three times of that of the single-stage buck converter, the working frequency of the capacitor voltage of the 4-stage buck converter is four times of that of the single-stage buck converter.

It could be seen from the trend change in FIG. 17, the more the number of the stage (the higher the value of N) is, the higher the working frequency of the capacitor voltage is and the smaller the output voltage ripple is. The smaller the voltage ripple is, the smaller the capacitor could be selected to use, and the higher the generated power density is.

In addition, the multi-stage buck converter of the disclosed embodiment could effectively reduce the loss of the power switch module. According to the simulation experiment, in light-load working mode (in the case of the output current of the power conversion module ranging between 3 amperes and 10 amperes), compared with the single-stage buck converter, the conduction loss (the loss is generated when the power switch is conducted) of the 4-stage buck converter is reduced by 50%, and the switching loss (the loss is generated when the power switch is non-conducted) of the 4-stage buck converter is reduced by 25%. In the heavy-load working mode (in the case of the output current of the power conversion module ranging between 20 amperes and 100 amperes), compared with the single-stage buck converter, the conduction loss of the 4-stage buck converter is reduced by 50%, and the switching loss of the 4-stage buck converter is reduced by 25%.

In summary, the multi-stage buck converter of the embodiment of the present disclosure could achieve the dual technical effects of high power density and low loss.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A multi-stage buck converter, comprises:
   a capacitor string, comprising N capacitors connected in series;
   a power switch module, coupled to the capacitor string and comprising N power switch groups, and
   a power conversion module, coupled to the power switch module and comprising an energy storage element;
   wherein a working frequency of the power conversion module is equal to N times of the switching frequency of each of the N power switch groups, and N is a positive integer greater than or equal to 3;
   wherein the working frequency is the number of times of the energy storage element that completes charging and discharging in a unit time;
   wherein each power switch group of the N power switch groups comprises a first power switch and a second power switch, and the multi-stage buck converter further comprises:
   a first trace connecting a first capacitor of the N capacitors with a second capacitor of the N capacitors;
   a second trace connecting the first power switch of the second power switch group with the second power switch of the first power switch group;
   a third trace connecting the first trace with the second trace, wherein there is no power switch disposed on the third trace;
   a fourth trace connecting the second capacitor of the N capacitors with a third capacitor of the N capacitors;
   a fifth trace connecting the first power switch of the third power switch group with the second power switch of the second power switch group; and a sixth trace connecting the fourth trace with the fifth trace, wherein there is no power switch disposed on the sixth trace.

2. The multi-stage buck converter according to claim 1, wherein a $n^{th}$ capacitor is coupled to the first power switch and the second power switch of a $n^{th}$ power switch group, and n is a positive integer between 1 and N.

3. The multi-stage buck converter according to claim 2, wherein in a $n^{th}$ charging interval, the first power switch and the second power switch of the $n^{th}$ power switch group are conducted simultaneously, and the first power switch and the second power switch of each of the others of the N power switch groups is non-conducted, so that the $n^{th}$ capacitor charges the power conversion module.

4. The multi-stage buck converter according to claim 2, wherein a first terminal of the $n^{th}$ capacitor is coupled to a second terminal of a (n−1)th capacitor, a first terminal of the first power switch of the $n^{th}$ power switch group is coupled to a trace between the first power switch of the first power switch group and a first terminal of the energy storage element, a second terminal of the first power switch of the $n^{th}$ power switch group is coupled to a trace between a second terminal of the (n−1)th capacitor and the second power switch of a (n−1)th power switch group, and the second power switch of the $n^{th}$ power switch group is coupled to a trace between a second terminal of the $n^{th}$ capacitor and a second terminal of the energy storage element;

wherein n ranges between 2 and N.

5. The multi-stage buck converter according to claim 2, wherein a first terminal of the first power switch of the $n^{th}$ power switch group is coupled to a first terminal of the power conversion module, a second terminal of the first power switch of the $n^{th}$ power switch group is coupled to a first terminal of the second power switch of a (n−1)th power switch group, and a second terminal of the second power switch of the (n−1)th power switch group is coupled to a second terminal of the power conversion module;

wherein n ranges between 2 and N.

6. The multi-stage buck converter according to claim 1, wherein the power conversion module further comprises a power switch; in a discharging interval, the power switch of the power conversion module is conducted, and all of the N power switch groups are non-conducted, so that the power conversion module is discharged.

7. The multi-stage buck converter according to claim 1, wherein the power conversion module further comprises a power switch, two terminals of the power switch are respectively coupled to two terminals of the power switch module, and two terminals of the energy storage element are respectively coupled to the two terminals of the power switch module.

8. The multi-stage buck converter according to claim 1, wherein each of the N power switch groups comprises a plurality of power switches; in a discharging interval, two of the power switches of two of N power switch groups are conducted, but the power switches of the others of the N power switch groups are non-conducted, so that the power conversion module discharges.

9. The multi-stage buck converter according to claim 1, wherein N power switch groups comprises a plurality of power switches, and the power conversion module and the power switch module share one or some of the plurality of power switches.

10. The multi-stage buck converter according to claim 1, wherein power conversion module comprises a diode, and two terminals of the power switch module are coupled to two terminals of the diode.

11. The multi-stage buck converter according to claim 1, wherein a $n^{th}$ power switch group of the N power switch groups comprises a power switch and a diode, a $n^{th}$ capacitor is coupled to the power switch of the $n^{th}$ power switch group and the diode, and n is a positive integer between 1 and N.

* * * * *